US005822750A

United States Patent [19]
Jou et al.

[11] Patent Number: 5,822,750
[45] Date of Patent: Oct. 13, 1998

[54] OPTIMIZATION OF CORRELATED SQL QUERIES IN A RELATIONAL DATABASE MANAGEMENT SYSTEM

[75] Inventors: Michelle M. Jou; Ting Yu Leung; Mir Hamid Pirahesh, all of San Jose, Calif.

[73] Assignee: International Business Machines Corporation, Armonk, N.Y.

[21] Appl. No.: 884,868

[22] Filed: Jun. 30, 1997

[51] Int. Cl.[6] .................................................. G06F 17/30
[52] U.S. Cl. ................................................ 707/2; 707/3
[58] Field of Search .............................................. 707/2–5

[56] References Cited

U.S. PATENT DOCUMENTS 5,548,755  8/1996  Leung et al. ................................. 707/2
5,548,758  8/1996  Pirahesh et al. ............................ 707/2

OTHER PUBLICATIONS

Praveen Seshadri et al., "Filter Joins: Cost–Based Optimization for Magic Sets," 18 pages @ http://www.hzdl.org., Jun. 1995.
"Complex Query Deccorrelation", P. Seshadri et al., *1996 IEEE*, pp. 450–458.
"On Optimizing an SQL–like Nested Query", Won Kim, *ACM Transactions on Database Systems*, vol. 7, No. 3, Sep. 1982, pp. 443–469.
"Of Nests and Trees: A Unified Approach to Processing Queries that Contain Nested Subqueries, Aggregates, and Quantifiers", U. Dayal, *Proceedings of the 13th VLDB Conference, Brighton 1987*, pp. 197–208.
"Optimization of Nested SQL Queries Revisited", R. A. Ganski, *1987 ACM*, pp. 23–33.

*Primary Examiner*—Paul V. Kulik
*Attorney, Agent, or Firm*—Gray Cary Ware Freidenrich

[57] ABSTRACT

A relational database management system (RDBMS) efficiently evaluates correlated subqueries by decorrelating them and taking care of the so-called SQL count bug and yet avoid using the expensive outer join operation. When there is no tuple match from a correlated subquery, the RDBMS query processor returns a tuple of null(s) from a scalar derived table, and then uses COALESCE function to generate a proper count value of zero from the null. The correlation level remains one. The query processor also performs a pass-through optimization to eliminate a join operation for floating SELECT operation by removing a join operation involving the magic operation, so that the correlation bindings are received from the correlation source table rather than the magic operation.

21 Claims, 19 Drawing Sheets

OPTIMIZATION OF CORRELATED SQL QUERIES IN A RELATIONAL DATABASE MANAGEMENT SYSTEM

BACKGROUND OF THE INVENTION

1. Field of the Invention

This invention relates generally to database management systems and, more particularly, to efficient evaluation of SQL statements processed in relational database management systems.

2. Description of the Related Art

Information is frequently stored in computer processing systems according to relational database data formats. A relational database structures information as a collection of tables having interrelated columns and rows. A relational database management system (RDBMS) provides a user interface to store and retrieve the information and provides a query methodology that permits table operations to be performed on the data. One such RDBMS interface is the Structured Query Language (SQL) interface, which is specified by standards adopted by the American National Standards Institute (ANSI) and the International Standards Organization (ISO) following original development work by International Business Machines (IBM) Corporation. The SQL interface permits users to formulate operations on the data tables either interactively, or through batch file processing, or embedded in host languages such as C, COBOL, or the like.

In particular, SQL provides table operations that permit users to form one or more new tables out of the operation results. SQL permits users to link data from multiple tables, or views, to perform complex sets of table operations with a single statement. An SQL statement is called a query and specifies table operations, target tables or portions of tables, and linking operators coupling the table operations.

In SQL, a "SELECT" statement is used to retrieve data, and generally has the format "SELECT <clause> FROM <clause> WHERE <clause>". Although the SQL statement generally must follow this syntax, only the SELECT and FROM clauses are required. The SELECT clause retrieves a subset of data from one or more existing tables or views that are stored in the relational database, and the FROM clause identifies the source table or view from which data is being selected. The items specified in the SELECT clause determine the columns that will be returned in the result table from the table identified in the FROM clause.

The WHERE clause determines which rows should be returned in the result table. Generally, the WHERE clause contains a search condition that must be satisfied by each row returned to the result table. The rows that meet the search condition form an intermediate set, which is then processed further according to specifications in the SELECT clause. The search condition typically comprises one or more "predicates", each of which specify a comparison between two values comprising columns, constants, or correlated values. Multiple predicates may be present in the WHERE clause, typically connected by Boolean operators.

Another operation permitted by SQL is the "JOIN" operation, which combines rows from one table or view with those from another table or view. The rows, or portions of rows, from the different tables or views are concatenated horizontally. The join operation is implied, for example, by naming more than one table or view in the FROM clause of a SELECT statement. Although not required, join operations normally include a WHERE clause that identifies the columns selected from each table.

These operations can be combined together to extract or retrieve the desired set of data from the tables. For example, a table that contains the names of all supervisory employees who live in a given city might be created by selecting employee names and cities from one table, and then joining that data with selected employee names and job titles from another table.

Evaluation of SQL Statements

To optimize performance when processing queries, it is desirable to select a method or "plan" to execute the query with the lowest estimated computational cost. Database users typically seek to retrieve data in the least possible amount of time, to minimize the "cost" of the query in terms of the required personnel and the processing time. When the database is large, data retrieval time can even be critical to the operability of the database. There are many ways in which a query can be processed, each requiring different amounts of the computer's time and memory. One consideration, for example, is the order in which the query elements are processed and data is retrieved.

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar table comparison operation. SQL queries and their resulting table operations can be nested through several respective levels of predicates containing SQL table operations such that the outcome of an outer level query is used to evaluate an inner level query. The inner nested levels of SQL operations are referred to as subqueries, and the subqueries are said to be correlated to an outer level query.

Nested SQL statements may require tuple-by-tuple data manipulation in each subquery for evaluation of the complete statement. For example, each entry of a table column may need to be compared against each entry of a corresponding column in another table to determine if a SELECT operation should retrieve a table row. Such tuple-by-tuple operations are very inefficient. This is especially so in the case of computer systems implemented as so-called massively parallel processing (MPP), shared-nothing systems. In an MPP system, many different processors are linked together across a local area network (LAN). Each processor comprises a node of the MPP network and each processor includes local memory and one or more data storage devices. An RDBMS that is maintained on an MPP system could require much inter-node communication to evaluate a query that involves many tables that are stored at different nodes across the network. Even a query that involves a single table still can require inter-node communication, because parts of the single table sometimes are located on different nodes. The different parts of the table must be collected at a single node for certain operations. It should be clear that SQL operations carried out on sets of data are much more efficiently performed as compared to tuple-by-tuple evaluation of data.

In an SQL system, queries are received by the SQL interface and are rewritten in an SQL processor from the input format provided by the user into generally standard SQL language. The SQL processor includes an SQL compiler that converts the SQL query into rewritten SQL standard language. To evaluate a query, the SQL processor provides the rewritten SQL code to an SQL optimizer, which generates many SQL execution plans and determines the best (least-cost) execution plan for implementation. The SQL optimizer can choose, for example, from among alternative combinations of SQL operators to implement an execution plan more efficiently. Thus, efficiency of operation is generally very important in an RDBMS.

Graphical Representation of SQL Queries

A useful tool in describing SQL queries and their evaluation is a graphical representation of SQL statements known as Query Box Representation (QBR). A number of known SQL optimizers employ various types of QBR to facilitate their processing and optimization efforts. QBR provides a powerful and manageable representation of queries to reduce the complexity of query compilation and optimization procedures. Additionally, QBR provides a tool for optimizing queries by facilitating rewriting the QBR components in efficient arrangements.

Generally, a QBR representation employs hierarchically arranged "boxes" to represent subquery operations such as SELECT and GROUP BY, for example. The interconnections between the boxes define the relationship between different items of data from different subquery operations.

Various techniques may be used to store a complex query in computer memory in accordance with a QBR format. Specifically, multiple data structures in the memory are used to represent the QBR boxes and interrelationships. These data structures may comprise, for example, records and associated pointers, strings, stack arrangements, doubly linked lists, hashing arrangements, or other suitable formats. Preferably, records and pointers are used, where each record represents a QBR box, and the pointers represent the relationships between the boxes. Each record also includes a listing of various properties associated with the corresponding QBR box.

A number of different types of QBR are known in the art. One of the more popular types of QBR is known as the "query graph model." The query graph model is well known in the art, and is described in the following reference, which is incorporated by reference in its entirety: Pirahesh et al., "Extensible/Rule Based Query Rewrite Optimization in Starburst," *Proceedings of ACM SIGMOD '92 International Conference on Management of Data,* San Diego, Calif., U.S.A., 1992.

The query graph model supports arbitrary table operations where the inputs are tables and outputs are tables, such as the SELECT, GROUP BY, UNION, INTERSECT, and EXCEPT operations defined in the SQL standard, and the restriction, projection and join operations performed by the SELECT operation.

When a query is represented by the query graph model, each operation of the query may be graphically represented by a box having a head and body. The body of a query graph model box may include "quantifiers", comprising table references or derived tables. Quantifiers have different types. Type "F" (For Each) quantifiers correspond to the table references in the FROM clause of the SQL query. Type "A" (Universal) quantifiers correspond to the ALL subquery in the WHERE clause. Type "E" (Existential) quantifiers correspond to the subquery associated with SQL's predicates EXISTS, IN, ANY, and SOME. Type "ES" (Existential Single) quantifiers correspond to scalar quantifiers in that the database system has to enforce the fact that at most one tuple can be returned from the subquery.

The query graph model boxes are coupled to each other by quantifier "edges", also called "arcs". The head of a box describes the output data stream or table produced by the operation, and the body specifies the operation required to compute the output table from records flowing into the body. The head specifies each output column, such as those specified in the SELECT clause of a query, an includes column names, types, and output ordering information. The head, body, and quantifiers of a box may each have a separate attribute called "distinct", to manage the production of duplicate tuples.

FIG. 1 illustrates an exemplary query graph model corresponding to the SQL query depicted in Table 1 (below).

TABLE 1

SELECT Distinct Q1.partno, Q1.descr, Q2.suppno
FROM inventory Q1, quotations Q2
WHERE Q1.partno = Q2.partno AND Q1.descr='engine'
  AND Q2.price $\leq$ ALL
    (SELECT Q3.price
    FROM quotations Q3
    WHERE Q2.partno = Q3.partno);

The query of Table 1 provides information about suppliers and parts for which the supplier price is less than that of all other suppliers. The corresponding query graph model of FIG. 1 contains four boxes 100, 101, 102, 103. Two of the boxes 100 and 101 are associated with the tables INVENTORY and QUOTATIONS, respectively. The third box 102 is a SELECT box representing the main part of the query, and the last box 103 is a SELECT box representing the subquery.

In accordance with query graph model convention, each of the boxes 100–103 has a head and a body, where each head describes the output columns produced by the associated box, and the body specifies the operation required to compute the output. "Base" tables, exemplified by boxes 100–101, are considered to have empty or non-existent bodies because they do not perform any operations.

Referring in greater detail to the SELECT box 102, a head 105 is shown, specifying output columns PARTNO, DESCR, and SUPPNO; these correspond to the SELECT clause of the main query. The specification of these columns includes column names, types, and output ordering information. The head 105 includes a distinct attribute 106, which indicates that the associated table contains only distinct tuples.

The body of each non-base table box contains a graph, the vertices of which represent quantified tuple variables, called quantifiers. The vertices are also called "nodes." In the box 102, for example, vertices 108–110 correspond to quantifiers Q1, Q2, and Q4. Quantifiers Q1 and Q2 range over the INVENTORY and QUOTATIONS base tables respectively, and correspond to the table references in the FROM clause of the SQL query.

As stated above, arcs connect quantifiers to other boxes or to each other. For example, the Q1 and Q2 quantifiers (nodes 108–109) are connected via arcs 112–113 to the heads of the boxes 100–101, respectively. Arcs may also interconnect quantifiers of the same box where each inter-quantifier arc represents a predicate of the WHERE clause in the query block. Such predicates are represented by labelled rectangles along the corresponding edge. For example, the Q1 and Q2 quantifiers are interconnected by an edge 116 that represents a join predicate. A looped edge 118 attached to the Q1 (node 108) represents a local predicate on the quantifier Q1. In the head 105 of the box 102, each output column may have an associated expression corresponding to expressions allowed in the SELECT clause of the query. In FIG. 1, all of these expressions are simple identity functions over the referenced quantifier columns.

The output of a box can be used multiple times to create common sub-expressions. For example, a view may be used multiple times in the same query. Recursive queries, however, create cycles in query graph model. As the size of the graph grows, the cost of optimization also grows.

Correlated Subqueries

As noted above, SQL permits users to express queries using correlation between a query and its subqueries. Correlation refers to the use of values from an outer query block in the computation of an inner subquery block. More specifically, correlation refers to the condition where a subquery receives bindings from its ancestors. A QBR box is directly correlated if it contains a column reference from an ancestor box. The referenced column is called the correlation column. The ancestor is the source of correlation, and the box containing the correlation column is the destination of correlation.

A QBR box is recursively correlated to one of its ancestors if it is directly correlated to the ancestor, or if one of its descendants is directly correlated to one of its ancestors. The height of correlation of a correlation predicate is the number of quantifier edges that must be traversed to get from the source of correlation to the destination of correlation. A correlation is remote if the height of correlation is greater than one.

For a correlated subquery, correlation column references provide bindings during every execution of the subquery, although the values may be different depending on the execution of its ancestor query block. Bindings available via correlation column references are called correlation bindings. To illustrate correlation in greater detail, reference is made to the box 103, which represents the subquery of Table 1. The box 103 contains an F type quantifier Q3 (node 120) over the quotations table, and its body 122 contains a predicate that refers to Q2 and Q3. Because the predicate of the body 122 refers to Q2, which originates from a higher box (the box 102), this predicate is said to be "correlated," and the relationship is called a "correlation." It is essential that a query optimizer efficiently process correlated subqueries such as this. Among the reasons for the importance of efficiently processing correlated subqueries: many SQL programs and programmers use correlated subqueries; the semantics of SQL prohibit certain queries from being expressed without the use of correlation; query generation modules, which are being used more frequently, often have the effect of producing large and complex correlated queries; and correlated queries can cause especially acute performance degradations in parallel, distributed database environments.

One approach to processing correlated subqueries is "nested iteration". Nested iteration, which was introduced in the first-generation relational database systems such as System R, adopted a tuple-at-a-time approach to subquery execution in literal compliance with the semantics of SQL. To discuss nested iteration in greater detail, a sample SQL query is provided in Table 2, below.

TABLE 2

| SELECT | DEPT.name FROM DEPT | |
|---|---|---|
| WHERE | DEPT.budget < 10000 AND | |
| | DEPT.work_stations > | (SELECT COUNT(*) |
| | | FROM EMP |
| | | WHERE DEPT.building = |
| | | EMP.building) |

If the query of Table 2 is evaluated using nested iteration, the subquery is invoked once for every DEPT tuple in the outer block, where the budget of that DEPT is less than 10000.

Although nested iteration may be adequate for some applications, it can be expensive since it repeats subquery invocation costs. Additionally, if the subquery involves expensive computations such as table scan and joins, added overhead may result from repeating such computations on each invocation. For example, in the example of Table 2, the table EMP may not have an index on the building column, thereby forcing a computationally expensive table scan access for every low-budget department tuple. Moreover, if there are duplicate values of DEPT.building, the subquery invocations may perform redundant work.

A number of approaches have been developed to "decorrelate" queries to increase the set-oriented nature of the resultant query. Decorrelation is the process of transforming a subquery to remove any correlations that may be present. Some QBR box types can be decorrelated, whereas other types cannot.

One decorrelation approach is described in Kim, "On Optimizing an SQL-Like Nested Query", *ACM Transactions on Database Systems,* 7 Sep. 1982. Kim's method transforms complex queries by recognizing certain fixed forms of queries and by rewriting the queries. Still another known decorrelation technique is discussed in Dayal, "Of Nests and Trees: A Unified Approach to Processing Queries that Contain Nested Subqueries, Aggregates and Quantifiers", *Proceedings of the Eighteenth International Conference on Very Large Databases* (*VLDB*), pp. 197–208, 1987. Dayal concerns a decorrelation method based upon a query transformation technique that attempts to solve the count bug by using a strategically-placed outer join construct, so that missing subquery answers do not result in missing answers. In the case of Table 2, Dayal's modification combines the two query blocks along with the left outer-join operator to produce a transformed query. Yet another decorrelation approach is discussed in Ganski et al., "Optimization of Nested SQL Queries Revisited", *Proceedings of ACM SIGMOD '87,* International Conference on Management of Data, San Francisco, Calif., U.S.A., 1987 pp. 23–33. Ganski concerns a query transformation method that collects correlation values into a temporary table and joins the temporary table with a subquery. Instead of grouping on a key field of the outer relation, Ganski first projects a distinct collection of correlation values into a temporary relation. This temporary relation is then joined with the subquery, and the grouping is performed over each of the values in the temporary relation. These methods of decorrelation comprise specialized mechanisms to optimize restricted classes of queries, without being generally applicable to arbitrarily structured queries.

Evaluation of Correlated Subqueries in Large Systems

Efficient evaluation of correlated subqueries has received much attention from relational database management researchers. Evaluation of correlated subqueries can be very inefficient, especially in the case of computer systems implemented as massively parallel processing (MPP) systems using shared-nothing architecture. In an MPP, many different processors are linked together across a network. Each processor comprises a node of the MPP network and each processor includes local memory and one or more data storage devices. An RDBMS that is maintained on a MPP system could require much inter-node communication to evaluate a correlated subquery.

The inefficiency of correlated subquery evaluation in an MPP environment results in part because different parts of tables may be located on different network nodes, and evaluation of the correlated subqueries may require a tuple-by-tuple data manipulation. For example, each entry of a table column may need to be compared against each entry of a corresponding column in another table to determine if a SELECT operation should be performed to retrieve a table row, and each entry is potentially located at a different network node. Such tuple-by-tuple operations are very inefficient.

One example of the developmental efforts in correlated subquery evaluation is described in U.S. Pat. No. 5,548,755 to Leung et al., assigned to IBM Corporation. This patent describes a method of decorrelating complex correlated subqueries using what is referred to as a "magic decorrelation" operation. The magic decorrelation is one way of solving what is commonly referred to as the SQL "count bug", which is described next.

The SQL Count Bug

After decorrelating a query, a count of tuples that matched the query can sometimes be incorrect if one of the subqueries resulted in no matches. This is the well-known "count bug" of SQL and is typically "fixed" by using an outer join operation. Consider the following correlated subquery in Table 3:

TABLE 3

| SELECT | Q1.C1, Q1.C2, Q1.C3 | |
|---|---|---|
| FROM | T1 Q1 | |
| WHERE | Q1.C3 > 0 AND | |
| | Q1.C1 = (SELECT | COUNT (*) |
| | FROM | T2 Q2 |
| | WHERE | Q2.C2 = Q1.C2); |

The correlated subquery of Table 3 is illustrated graphically (using QBR) in FIG. 2. Graphically, the correlated subquery includes a first SELECT box 202 that represents selection of tuples from table TI where the third column (C3) is greater than zero and the first column (C1) satisfies a second SELECT clause. The GROUP BY box 204 relates to the COUNT function. The second SELECT box 206 relates to the SELECT clause that counts table entries where the second columns (C2) are equal. The equivalent decorrelated version of the Table 3 query is given by the version below in Table 4:

TABLE 4

```
WITH SUPPMAGIC(C1, C2, C3) AS
    (SELECT C1, C2, C3
    FROM T1
    WHERE C3 > 0),
MAGIC (C2) AS
(SELECT DISTINCT C2
FROM SUPPMAGIC),
SUBQ(C2, CNT) AS
    (SELECT Q3.C2, count(*)
    FROM T2 Q2, MAGIC Q3
    WHERE Q2.C2=Q3.C2
    GROUP BY Q3.C2),
OJOIN(C2, CNT) AS
    (SELECT Q4.C2, COALESCE(Q5.CNT, 0)
    FROM MAGIC Q4 LEFT JOIN SUBQ Q5
    ON Q4.C2=Q5.C2)
SELECT S.C1, S.C2, S.C3
FROM SUPPMAGIC S, OJOIN OJ
WHERE S.C1=OJ.CNT AND S.C2=OJ.C2;
```

Those skilled in the art will appreciate that the decorrelated query of Table 4 will be further optimized by an SQL processor using conventional query rewrite rules, such as merging derived tables and subquery-to-join transformations, and the like.

The decorrelated query of Table 4 is illustrated graphically (using QBR) in FIG. 3. Thus, FIG. 3 includes a SUPPMAGIC box 302 relating to table T1 and includes a first SELECT box 304 that relates to selection of columns where the third column value (C3) is greater than zero. The MAGIC operation box 306 relates to the MAGIC operation that selects from the SUPPMAGIC results. The outer join box 308 relates to the COALESCE function and the SUBQ Q4, Q5 combination clause of the query. The GROUP BY box 310 relates to the subquery involving the second column (C2) and a count value CNT. The last SELECT box 312 joins the magic table and the table in the subquery (T2).

The derived table SUPPMAGIC in Table 4 forms the supplementary magic table, and MAGIC forms the "magic" table (and thus it contains all correlation bindings) for the correlated subquery. The derived table SUBQ corresponds to the decorrelated version of the subquery, with correlation columns being a group-by item. The derived table OJOIN 308 is needed to produce a tuple with count zero because if a correlation value such as Q1.C2 in the correlated subquery (Table 3) does not match any Q2.C2 tuple, then the subquery returns zero as the count, whereas the decorrelated version of the subquery (Table 4) does not produce such a tuple in response to the failed match. Thus, Table 3 and Table 4 provide equivalent results, but clearly will not if the OJOIN operation is not included. This problem is referred to as the SQL count bug. In the evaluation of the decorrelated subquery, the supplementary magic table 302 and the decorrelated subquery are joined in the main SELECT statement for the user result.

The outer join operation requires joining the decorrelated subquery SUBQ and the magic table MAGIC 306. Unfortunately, the outer join is a potentially resource-intense operation (that is, it is an expensive operation). As noted above, efficient operation is very important in an RDBMS.

From the discussion above, it should be apparent that there is a need for a relational database management system that efficiently evaluates complex correlated subqueries. The present invention fulfills this need.

SUMMARY OF THE INVENTION

The present invention provides efficient correlated subquery evaluation in a relational database management system by decorrelating queries so as to take care of the count bug and yet avoid using the expensive outer join operation which was created during the decorrelation process. The present invention converts the outer join operation into a correlated scalar derived table with the COALESCE function, wherein the correlation is restricted to only one query level. A scalar derived table has the same property as a derived table except that when the output of a subquery is expected to be an empty set, a row of null value(s) will be returned. That is, a scalar derived table may return multiple rows of multiple columns and it will return at least one row of null(s) for the empty answer set. When there is no tuple match for each correlation binding in the scalar derived table, a null value is returned to the COALESCE function to generate a zero value and thereby take care of the count bug. The scalar derived table can be optimized without accessing any base tables. In this way, the invention can further optimize correlated derived table evaluation. Elimination of table access operations in evaluation of a query increases efficiency.

In another aspect of the invention, a "pass through" optimization operation is performed to eliminate a join operation generated by the decorrelation process for the "floating" select operation, which does not reference any base tables. The invention recognizes that a join operation can be removed from the floating select operation and the correlation bindings can be received from the correlation source table rather than a magic box operation.

In either of the operations described above, a relatively resource-costly join operation is eliminated and system operating efficiency is increased.

Other features and advantages of the present invention should be apparent from the following description of the preferred embodiment, which illustrates, by way of example, the principles of the invention.

DESCRIPTION OF THE PREFERRED EMBODIMENTS

Figure 4:
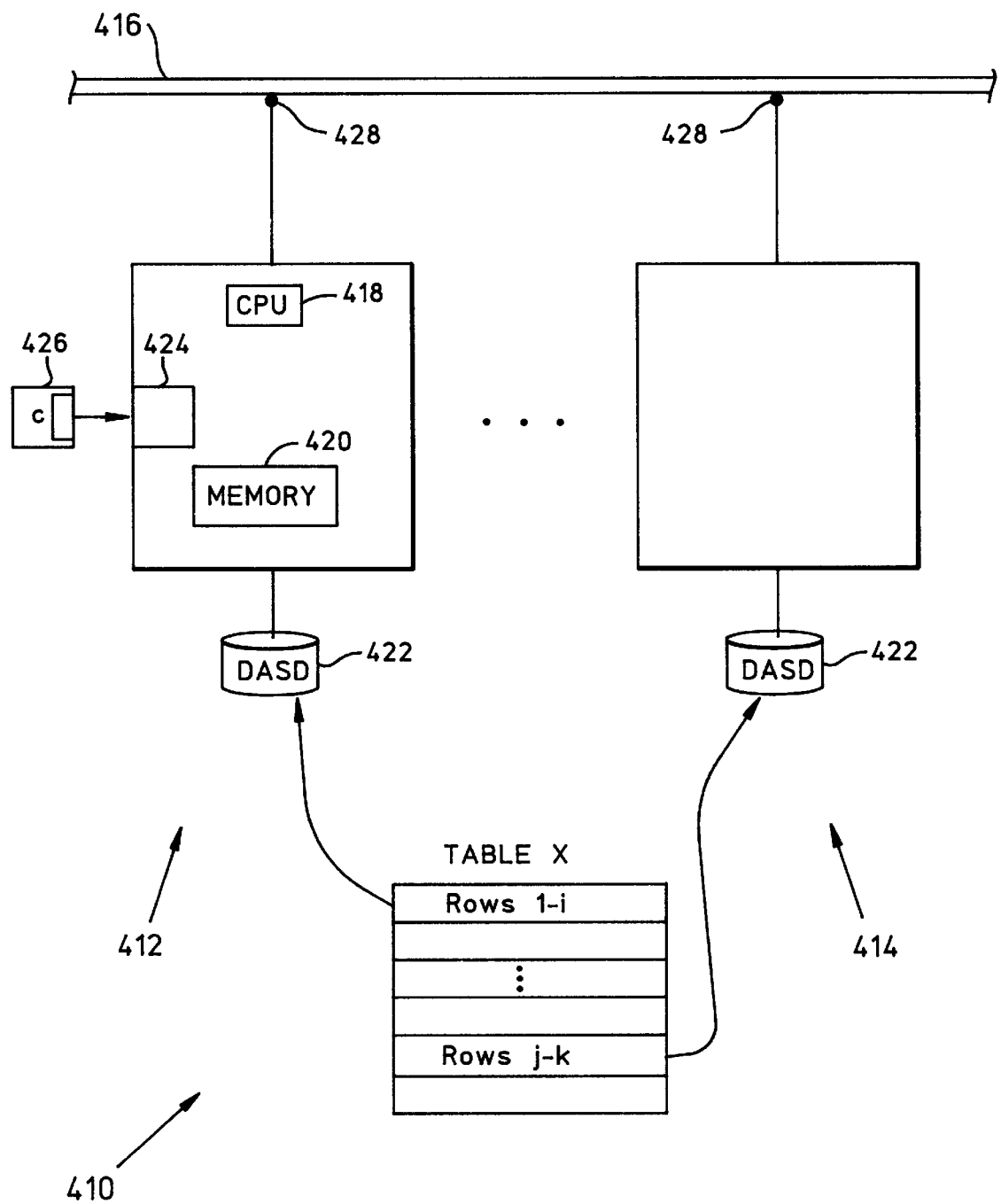
FIG. 4 is a representation of a computer network system constructed in accordance with the present invention.

FIG. 4 illustrates an exemplary computing system 410 constructed in accordance with the present invention. The system includes multiple computers, two of which 412, 414 are shown, connected to a communication network 416 in a massively parallel processing (MPP) shared-nothing configuration. Each of the computers 412, 414 has a similar construction, so that details described with respect to one computer will be understood to apply to all computers of the system. Each computer includes a central processing unit (CPU) 418, an operating main memory 420, and a local direct access storage device (DASD) 422, such as a disk drive. Each computer 412, 414 communicates with the others using the network 416.

The DASD units 422 of each computer contain table data that comprises a relational database management system (RDBMS). An application program provides an RDBMS interface to the users and can reside in each computer 412, 414 or can be installed on a single file server computer of the network. In either case, data files of the RDBMS are distributed across the DASD units of the network. Thus, a Table X of the RDBMS having multiple rows is stored across the computers of the network 416 such that rows 1 through i, for example, are stored in DASD of the first computer 412, rows j through k are stored in DASD of the second computer 414, and the remaining rows are stored in other computers (not illustrated).

In the preferred embodiment, the RDBMS interface comprises an SQL system and a user at a computer of the network 416 can pose a query containing correlated subqueries. In accordance with the invention, the processor will decorrelate the subquery, transform the subquery, and provide it to the optimizer of the RDBMS, wherein the transformation comprises replacement of the outer join operation generated by the decorrelation process with a correlated scalar derived table. In this way, the SQL count bug is solved without the necessity of an outer join operation, which can be an expensive operation to implement. Thus, system operating efficiency is increased.

Network Configuration

Each computer CPU 418 of the system performs its functions by executing instructions stored in the memory 420. The operating memory can be loaded with the instructions received through an optional storage drive 424 or through an interface with the network 416. The storage drive permits a program product storage device 426 to be received and for program steps recorded on the program product storage device to be read and transferred into the operating memory 420. In this way, the processing steps necessary for operation in accordance with the invention can be embodied on a program product. Those skilled in the art will appreciate that the program products can comprise machine-readable storage devices 426 such as magnetic media disks on which are recorded program instructions whose execution implements the framework of the present invention. The storage devices 426 also can comprise, for example, media such as optical disks and other machine-readable storage devices.

Other suitable program product storage devices can include magnetic tape, optical disk, and semiconductor memory. Alternatively, the program steps can be received into the operating memory 420 from the DASD 422, or over the network 416. In the latter method, the computer system also includes a network interface 428 that permits communication between the CPU 418 at the first node 412 and other computer systems 414 over the network 416. In that way, the computer system 412 can receive data into the main memory 420 through the interface 428 after network communication has been established by well-known methods that will be understood by those skilled in the art without further explanation.

RDBMS Configuration

Figure 1:
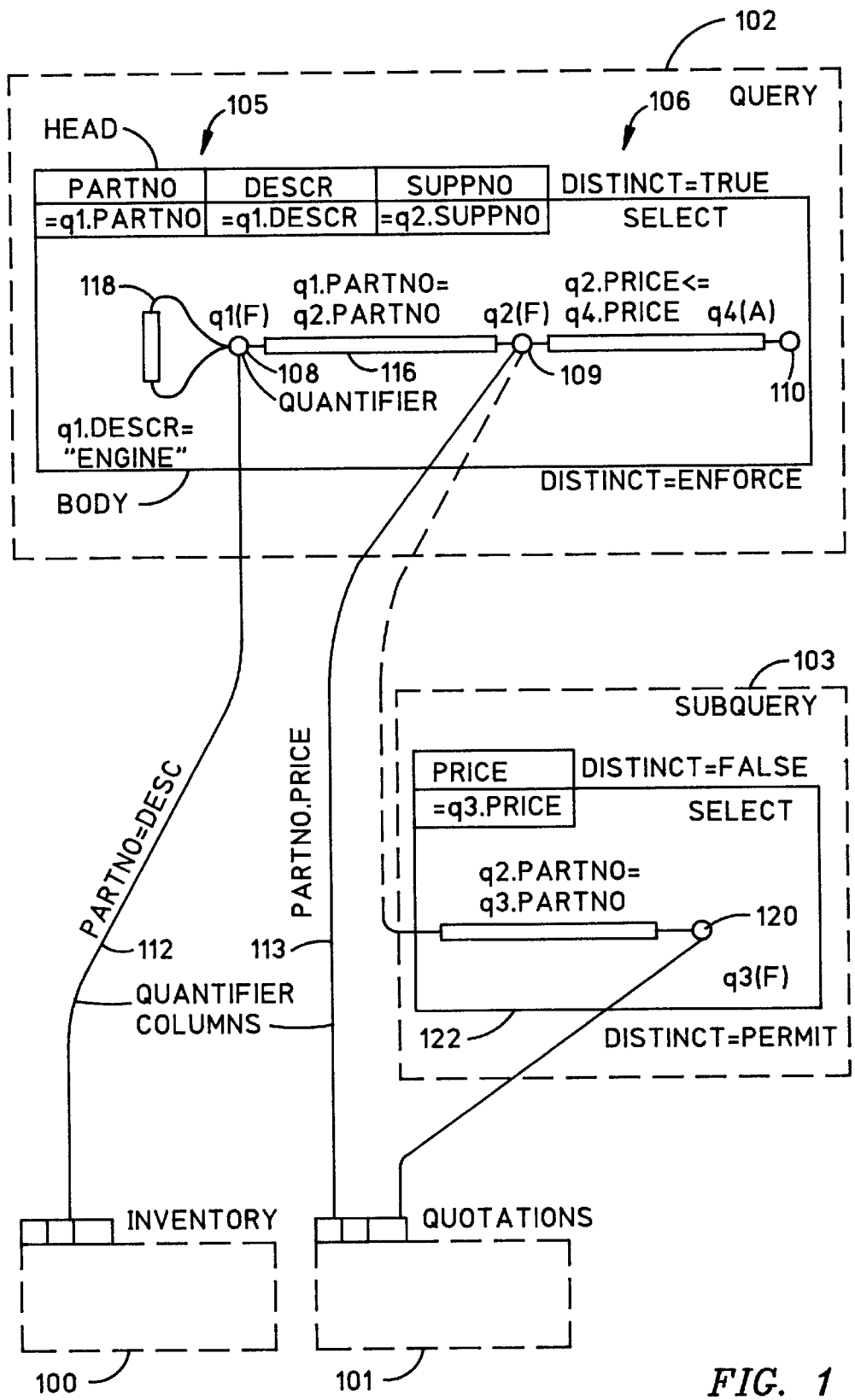
FIG. 1 is a query graph model representation of the exemplary SQL query depicted in Table 1.
Figure 2:
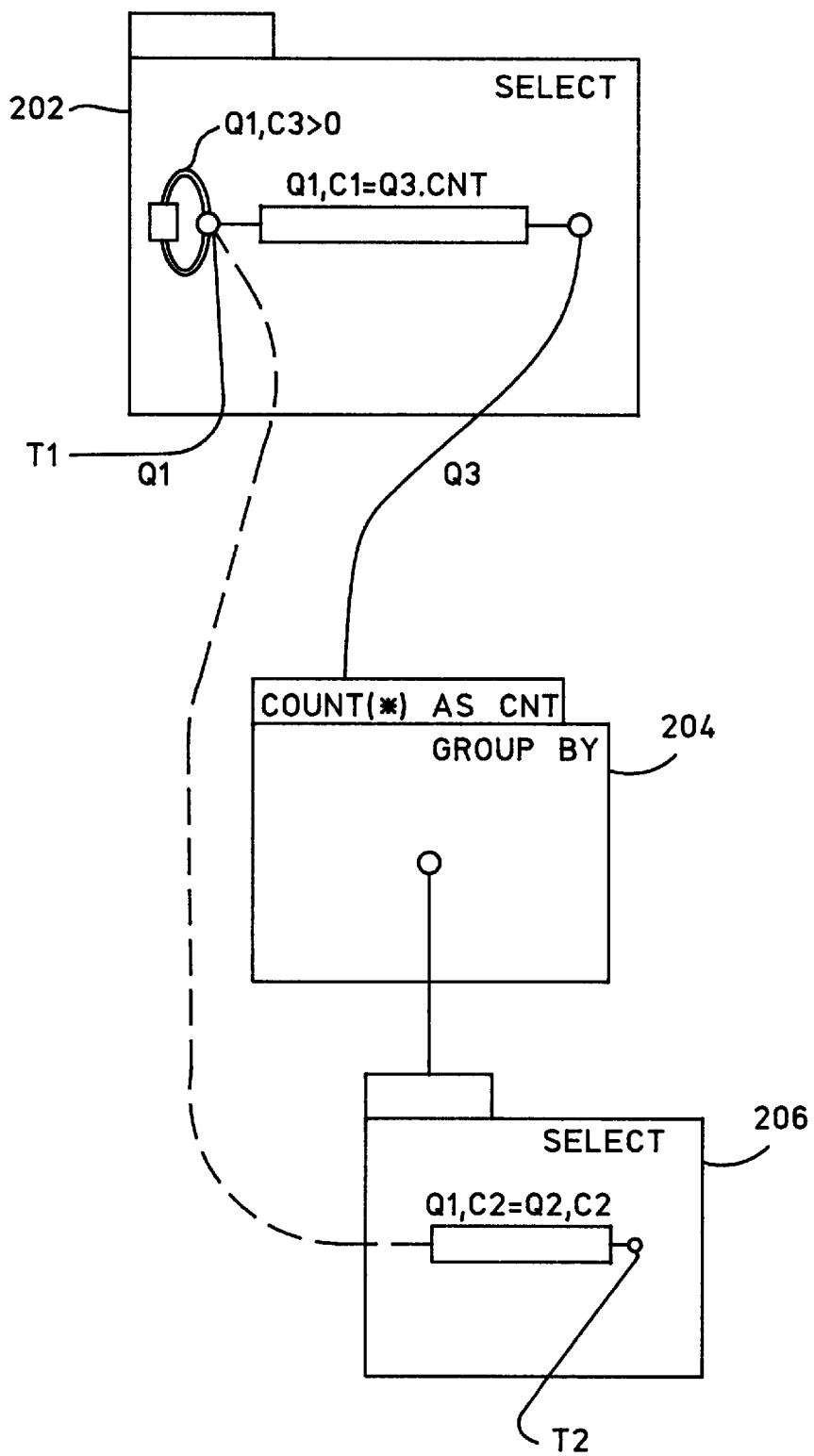
FIG. 2 is a query graph model representation of the exemplary SQL query depicted in Table 3.
Figure 5:
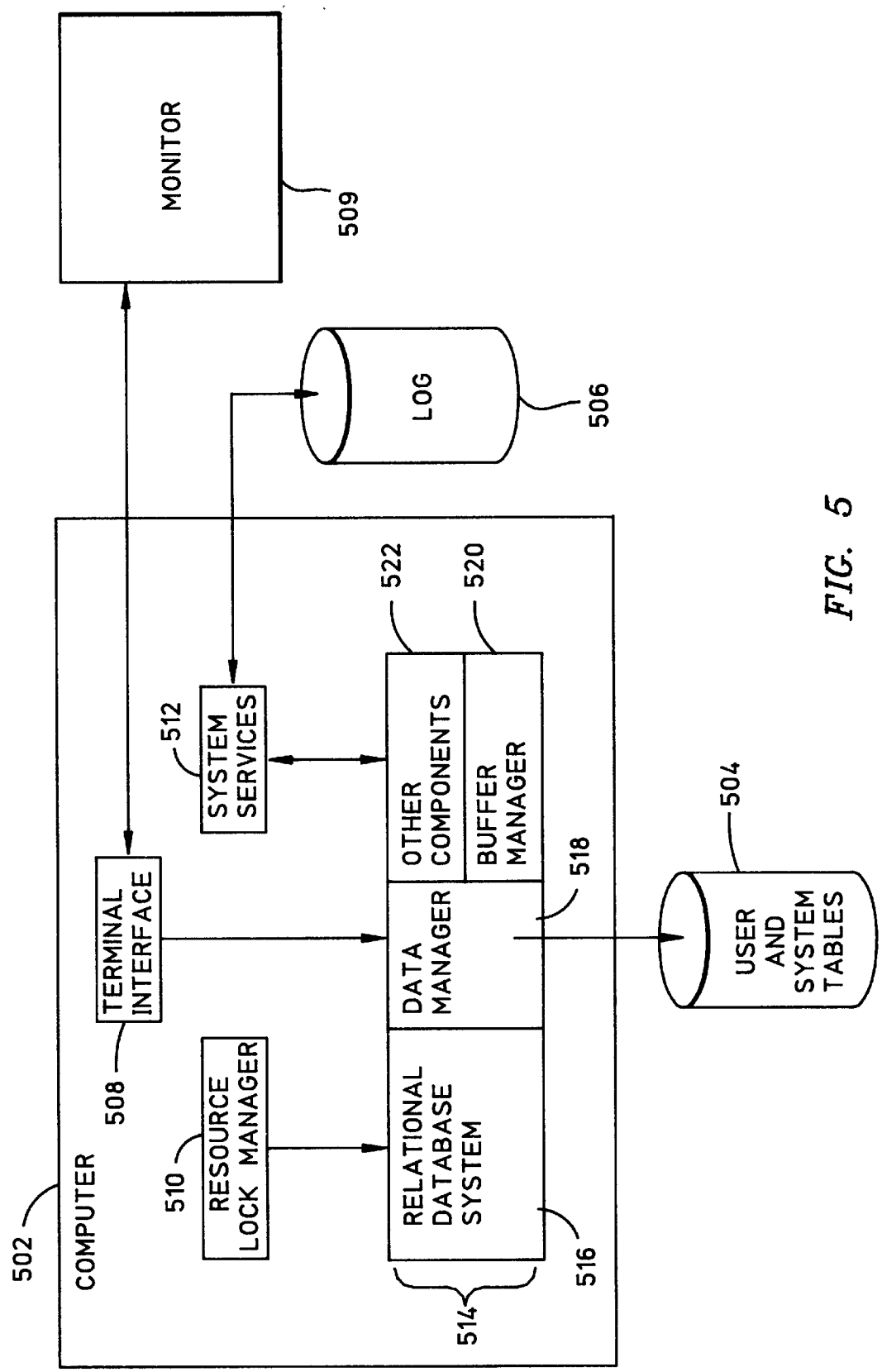
FIG. 5 is a representation of a computer processing system at a node of the FIG. 4 network that implements a relational data base management system in accordance with the present invention.

FIG. 5 illustrates a computer environment at a node of the exemplary RDBMS computing system shown in FIG. 1. In the exemplary computer environment, a computer system 502 at a node of the network accesses data storage devices, such as disk drives, in which are stored user and system tables 504 and log data tables 506. An operator of the computer system 502 uses a standard operator terminal interface 508, such as one of the interfaces known as IMS/DB/DC, CICS, TSO, OS/2, or some other appropriate interface, to transmit electrical signals to and from the computer system that represent commands for performing various search and retrieval functions against the databases 504, 506. These search and retrieval functions are generally referred to as queries. In the preferred embodiment of the present invention, these queries conform to the SQL standard, and invoke functions performed by RDBMS software. In the preferred embodiment of the present invention, the RDBMS software comprises the "DB2" product offered by the International Business Machines (IBM) Corporation for the "MVS", "AIX", or "OS/2" operating systems. Those skilled in the art will recognize, however, that the present invention has application to any RDBMS software that uses SQL, and may similarly be applied to non-SQL queries.

As illustrated in FIG. 5, the DB2 product architecture for the MVS operating system includes three major components: the Resource Lock Manager ("RLM") 510, the System Services module 512, and the Database Services module 514. The RLM handles locking services, because DB2 treats data as a shared resource, thereby allowing any number of users to access the same data simultaneously, and thus concurrency control is required to isolate users and to maintain data integrity. The Systems Services module 512 controls the overall DB2 execution environment, including managing the log data sets 506, gathering system statistics, handling startup and shutdown operations, and providing management support.

At the center of the DB2 product architecture is the Database Services Processor module 514. The Database Services Processor module contains several submodules, including the Relational Database System (RDS) 516, the Data Manager 518, and the Buffer Manager 520, and other database components 522 including an SQL compiler/interpreter. These submodules support the functions of the SQL language, such as definitions, access control, retrieval, and update of user and system data. The Database Services Processor module 514 preferably comprises one or more processors that execute a series of computer-executable programming instructions. These programming instructions preferably reside in storage locations such as fast-access memory 420 (see FIG. 4) of the computer 502. Alternatively, the instructions may be stored on a computer diskette 426 (FIG. 4), direct access storage device, magnetic tape, conventional "hard drive", electronic read-only memory, optical storage device, paper punch cards, or another suitable data storage medium containing logically segmented storage locations.

As noted above, and in accordance with the present invention, the SQL query processor of the RDBMS will respond to a user query having a correlated subquery by decorrelating the subquery and then subjecting the decorrelated subquery to a transformation in which the outer join operation is eliminated. The transformed, decorrelated query is then provided to the SQL optimizer of the RDBMS for further query optimization using known optimization techniques. In the preferred embodiment, such processing can take place in either an interactive operating mode or in a batch processing mode, as described next.

Interactive SQL Execution

Figure 6:
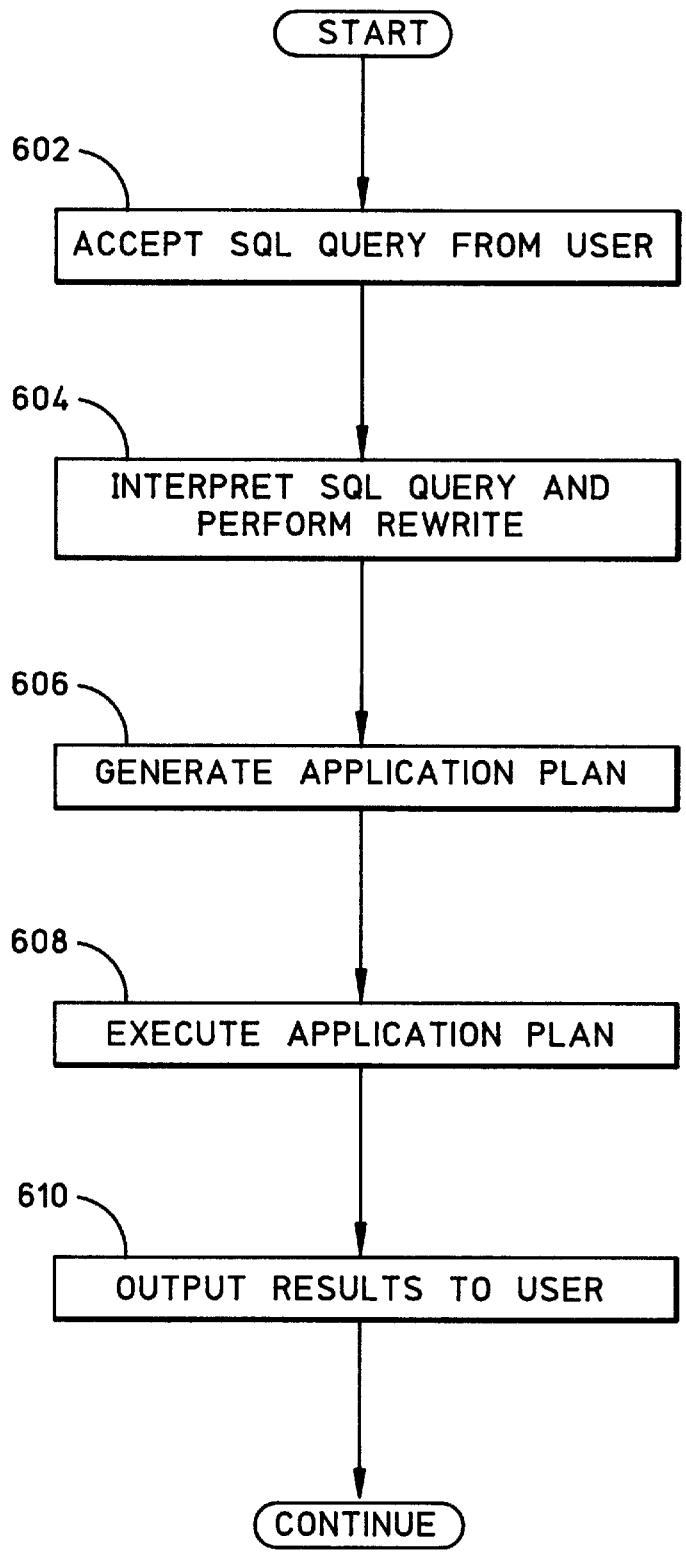
FIG. 6 is a flow diagram that illustrates the processing steps executed by the computer processing system of FIG. 5 to interpret and execute an SQL statement in an interactive environment.

FIG. 6 is a flow diagram that illustrates the operating steps necessary for the interpretation and execution of SQL statements in an interactive network environment such as shown in FIG. 4, in accordance with the present invention. The first flow diagram box of FIG. 6, numbered 602, represents the input of an SQL statement into the computer system from the user. The next flow diagram box 604 of FIG. 6 represents the step of compiling or interpreting the received SQL statement. This step may include a transformation function that transforms the SQL query in a manner described in greater detail below to eliminate join operations. The FIG. 6 flow diagram box numbered 606 represents the step of generating a compiled set of runtime structures called an application plan from the compiled SQL statements.

Generally, the SQL statements received as input from the user (step 602) specify the data the user wants, but not how to get to it. Generation of the application plan involves consideration of both the available access paths (indexes, sequential reads, etc.) and system held statistics on the data to be accessed (the size of the table, the number of distinct values in a particular column, etc.), to choose what the RDBMS processor considers to be the most efficient access path for the query. The FIG. 6 step represented by the flow diagram box numbered 608 represents the execution of the application plan. The last block 610 in FIG. 6 represents the output of the results of the application plan to the user.

Embedded/Batch SQL Execution

Figure 7:
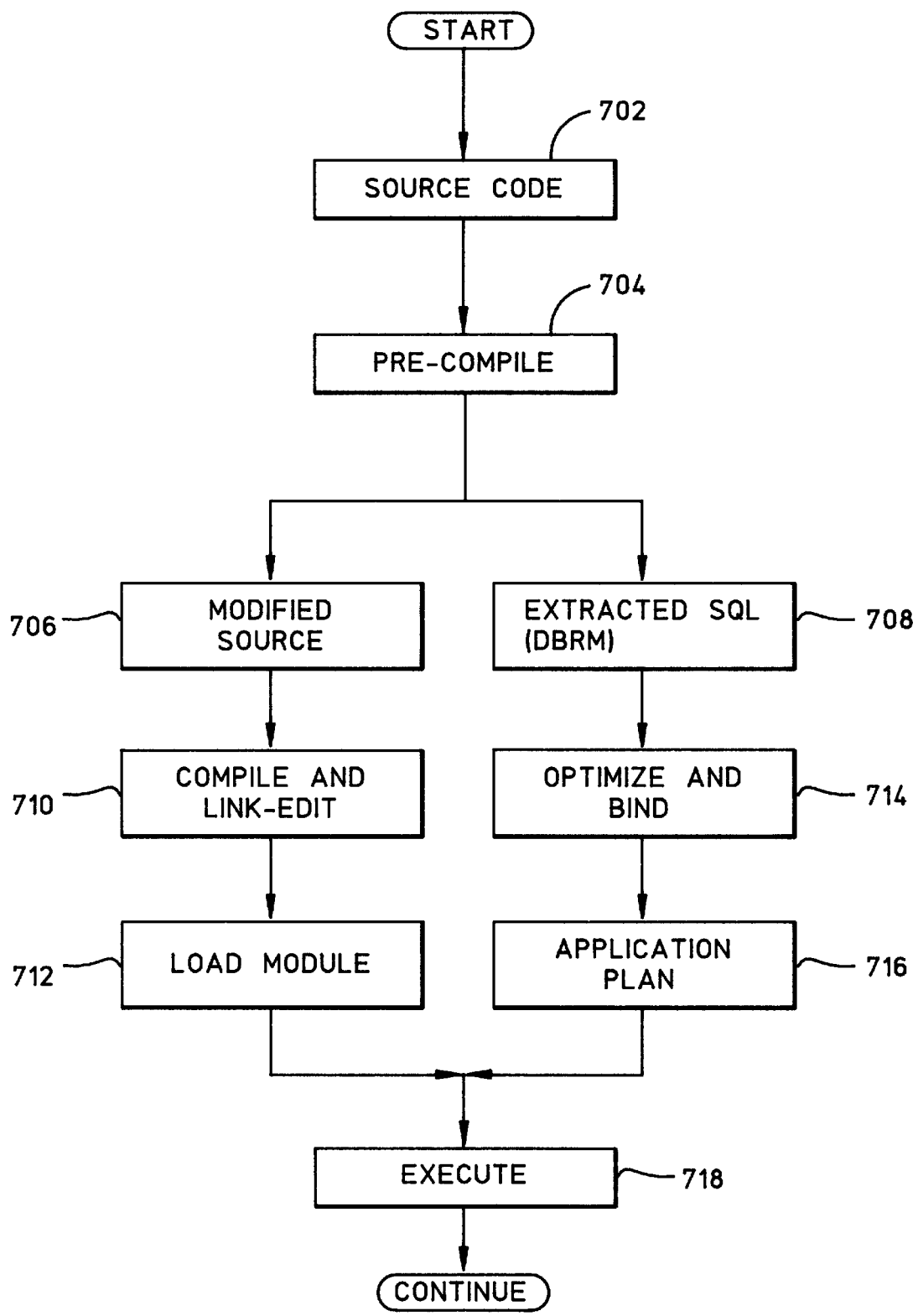
FIG. 7 is a flow diagram that illustrates the processing steps executed by the computer processing system of FIG. 5 to interpret and execute an SQL statement embedded in source code.

FIG. 7 is a flow diagram that illustrates the steps necessary for the interpretation and execution of SQL statements embedded in source code for batch operation according to the present invention. The first block 702 represents program source code containing a host language (such as COBOL or C) and embedded SQL statements that is received by the RDBMS processor for batch processing. The received program source code is next subjected to a pre-compile step 704. There are two types of output code from the pre-compile step 704: a modified SQL source module 706 and a Database Request Module ("DBRM") 708. The modified SQL source module 706 contains host language calls to the DB2 program, which the pre-compile step 704 inserts into the pre-compile output code in place of the SQL source statements. The other output of the pre-compile step, the DBRM 708, consists of the SQL statements from the program source code 702.

After the modified source 706 is produced, a compile and link-edit step 710 uses the modified source output to produce a load module 712, while an optimize and bind step 714 uses the DBRM output 708 to produce a compiled set of runtime structures for the application plan 716. As indicated above in conjunction with the description of FIG. 4, the SQL statements from the program source code 702 specify only the data that the user wants, but not how to get to it. In the preferred embodiment, the optimize and bind step 714 optimizes the SQL query in a manner described in greater detail below. The optimize and bind step then considers both the available access paths (indexes, sequential reads, etc.) and system held statistics on the data to be accessed (the size of the table, the number of distinct values in a particular column, etc.), to choose what it considers to be the most efficient access path for the query. The load module 712 and application plan 716 are then executed together at the last step, represented by the flow diagram box numbered 718.

Transformation of the Decorrelated Subquery

Figure 3:
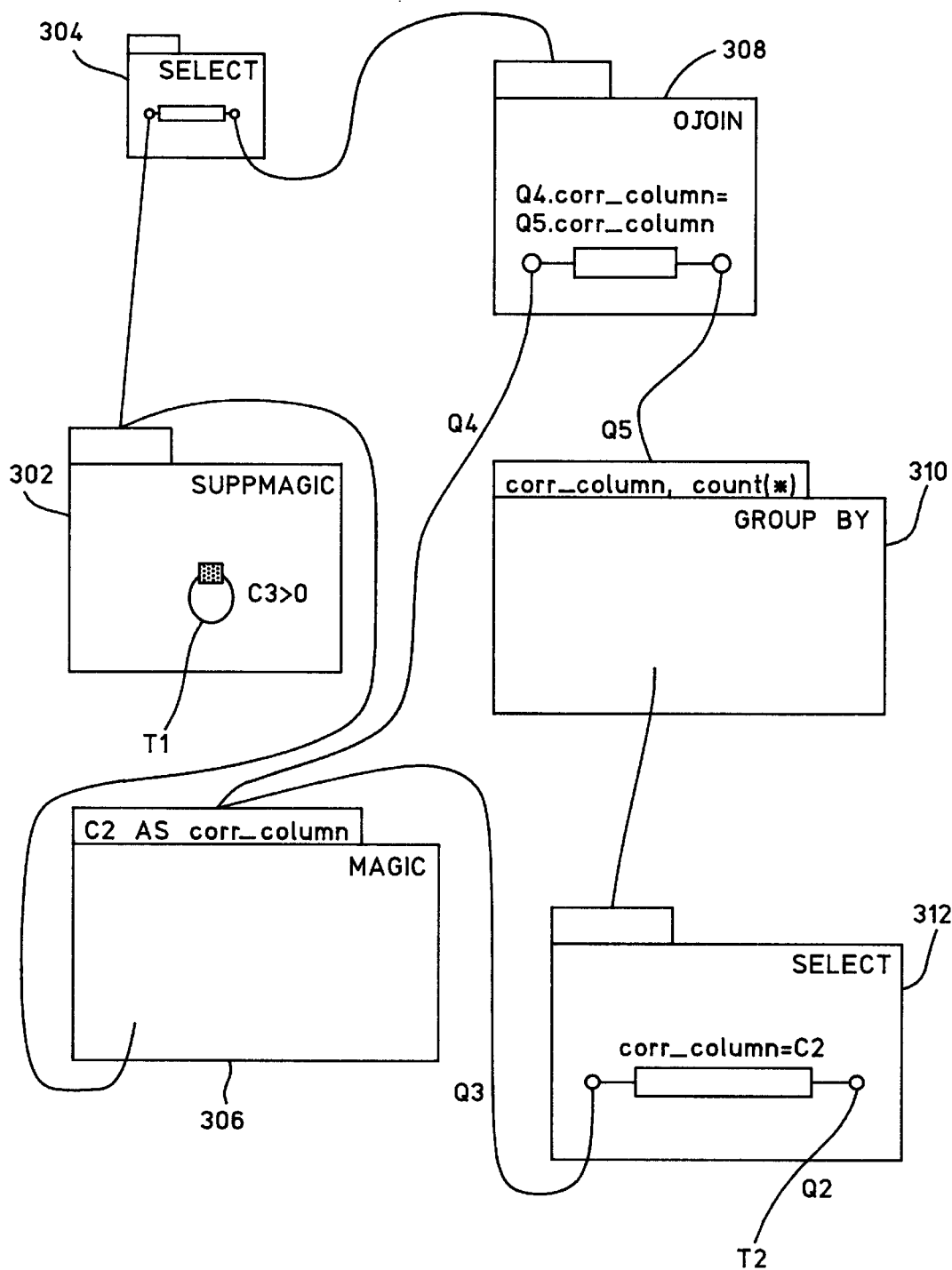
FIG. 3 is a query graph model representation of the exemplary decorrelated subquery depicted in Table 4.

The processing of the system in accordance with the invention will best be understood with reference to the exemplary decorrelated subquery listed in Table 4 (discussed above) and represented in FIG. 3, after additional query re-write optimizations have been applied, such as merging of select operations. Table 4 is reproduced once again, below:

TABLE 4

```
WITH SUPPMAGIC(C1, C2, C3) AS
    (SELECT C1, C2, C3
    FROM T1
    WHERE C3 > 0),
MAGIC (C2) AS
    (SELECT DISTINCT C2
    FROM SUPPMAGIC),
SUBQ(C2, CNT) AS
    (SELECT Q3.C2, count(*)
    FROM T2 Q2, MAGIC Q3
    WHERE Q2.C2=Q3.C2
    GROUP BY Q3.C2),
OJOIN(C2, CNT) AS
    (SELECT Q4.C2, COALESCE(Q5.CNT, 0)
    FROM MAGIC Q4 LEFT JOIN SUBQ Q5
    ON Q4.C2=Q5.C2)
SELECT S.C1, S.C2, S.C3
FROM SUPPMAGIC S OJOIN OJ
WHERE S.C1=OJ.CNT AND S.C2=OJ.C2;
```

The processor of the preferred embodiment transforms the decorrelated subquery of Table 4 so the outer join (OJOIN) operation is eliminated. The transformed decorrelated subquery is given by the version below in Table 5 (after additional query rewrite optimizations have been applied):

TABLE 5

```
WITH SUPPMAGIC(C1, C2, C3) AS
    (SELECT C1, C2, C3
    FROM T1
    WHERE C3 > 0),
MAGIC (C2) AS
    (SELECT DISTINCT C2
    FROM SUPPMAGIC),
SUBQ(C2, CNT) AS
    (SELECT Q3.C2, COUNT(*)
    FROM T2 Q2, MAGIC Q3
    WHERE Q2.C2=Q3.C2
    GROUP BY Q3.C2),
SELECT S.C1, S.C2, S.C3
FROM SUPPMAGIC S, TABLE (SELECT Q5.CNT
                FROM SUBQ Q5
                WHERE S.C2=Q5.C2) AS Q6 (CNT))
WHERE S.C1=COALESCE (Q6.CNT, 0);
```

Figure 9:
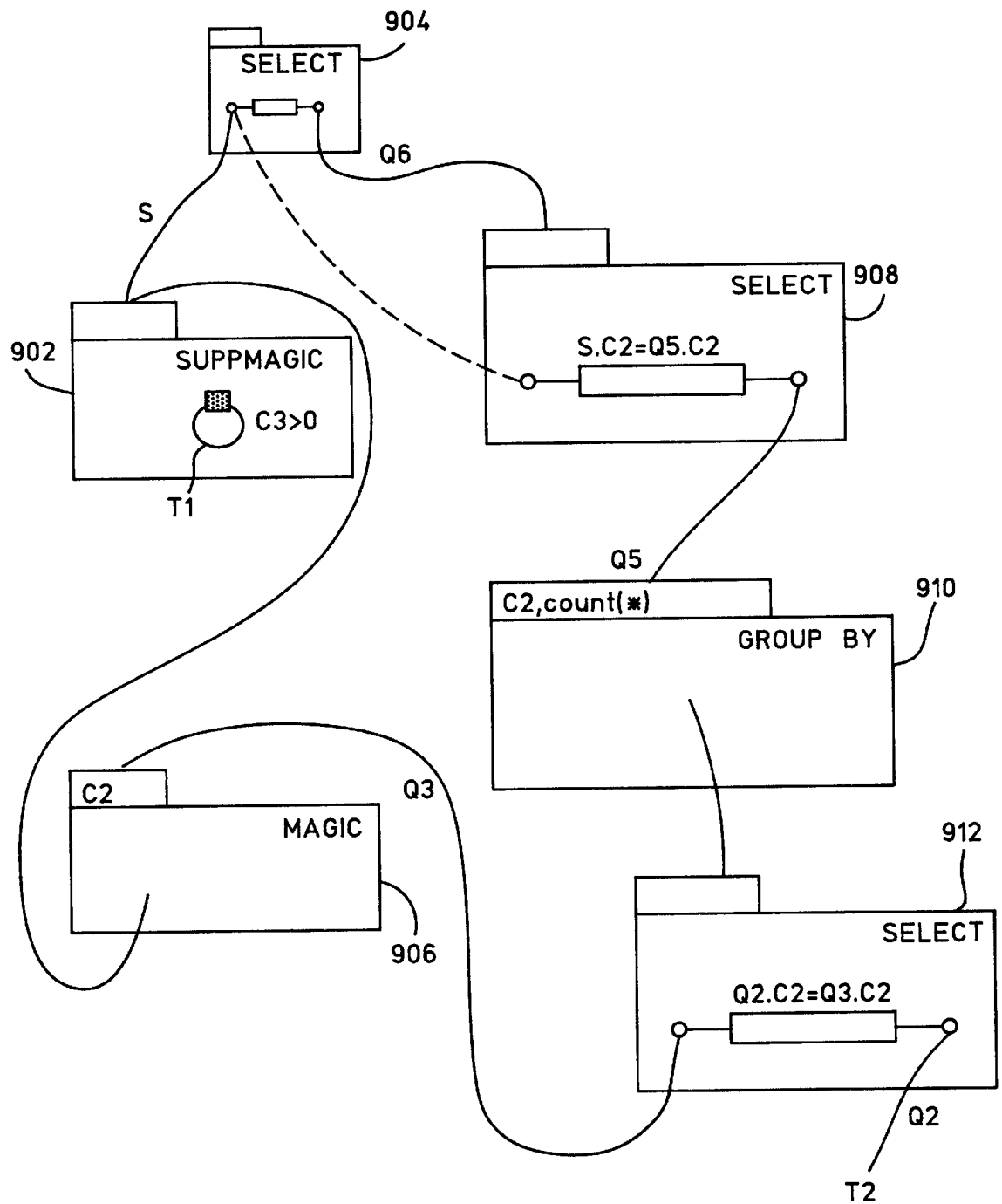
FIG. 9 is a query graph model representation of the transformed SQL query illustrated in FIG. 8 after the query processor has applied query rewrite optimizations.

The transformed decorrelated query of Table 5 is illustrated graphically (using QBR) in FIG. 9, after additional query rewrite optimizations such as view merge have been applied. The supplementary magic table is referenced in the SUPPMAGIC box 902. The magic box, which contains all correlation bindings, is referenced in the MAGIC box 906. After decorrelation, Table T2 is joined with all correlation bindings in a SELECT box 912 and the result is fed to a group by operation 910. The correlated derived table, represented by the SELECT box 908, returns null value(s) for an empty match. Those skilled in the art will understand that a correlated scalar derived table can be performed locally at each node of the network and in parallel because the tuples from the SELECT box 908 can be re-partitioned according to the sites where the tuples from the SUPPMAGIC box 902 reside, or vice versa. This increases efficiency of operation.

Figure 8:
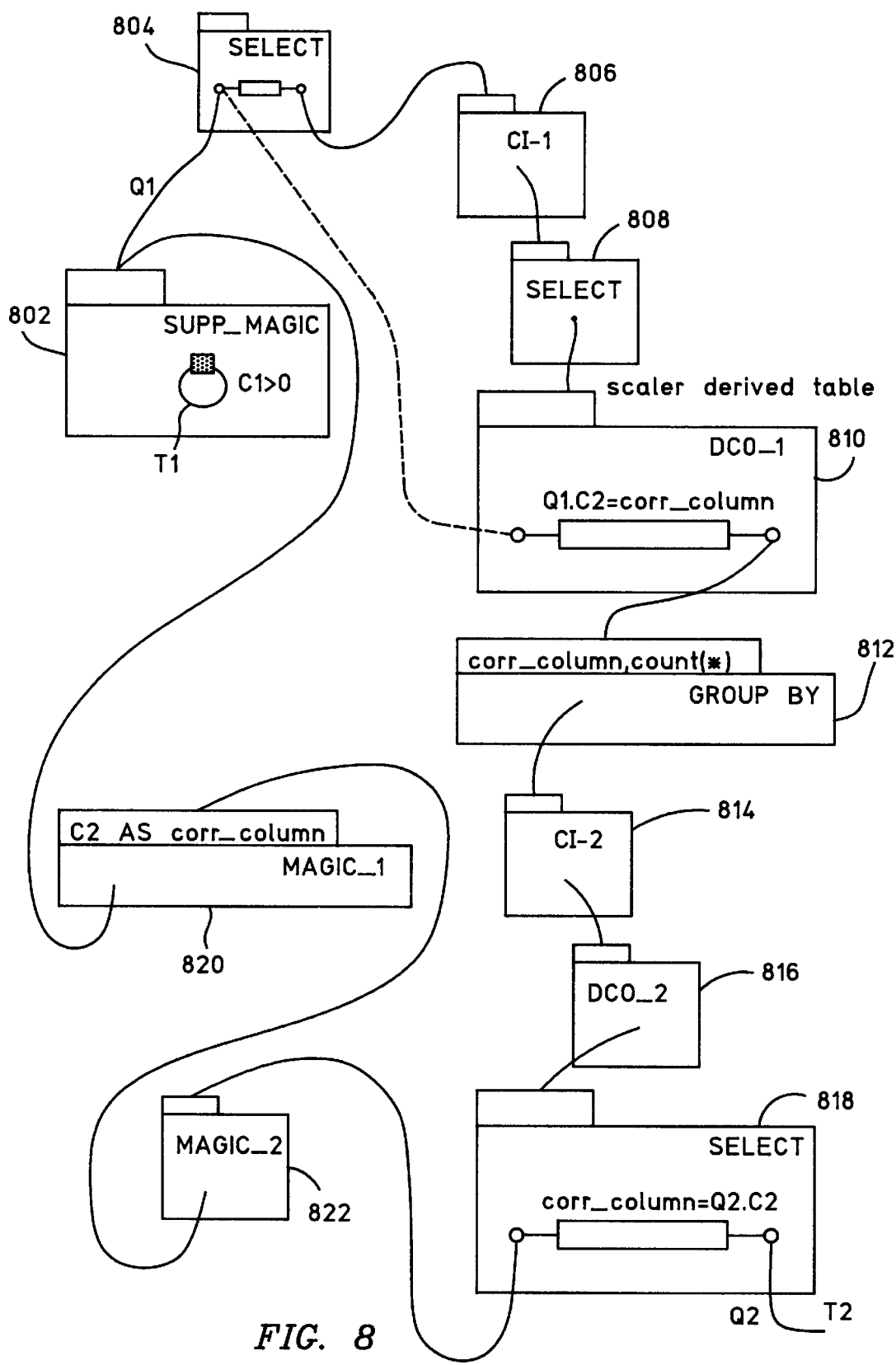
FIG. 8 is a query graph model representation of the SQL decorrelated subquery depicted in Table 5 and illustrated in FIG. 3, after transformation in accordance with the present invention to eliminate the outer join.

Those skilled in the art will also understand that the decorrelation process may create many SELECT boxes, such as shown in FIG. 8. The supplementary magic table is referenced in the SUPPMAGIC box 802. The magic boxes are referenced in MAGIC_1 (box 820) and MAGIC_2 (box 822) which provide correlation bindings to the FIG. 3 boxes 310 and 312 respectively during the decorrelation process. The CI and DCO boxes for the GROUP BY box 810 are boxes 806 and 810, respectively. Similarly, the CI and DCO boxes for the SELECT box 818 are boxes 814 and 816, respectively.

The transformation of the decorrelated subquery can be described as including the conversion of the outer join operation into a correlated scalar derived table. Those skilled in the art can easily understand that, by comparing FIG. 3 and FIG. 9, the present invention can be characterized as follows: the correlation bindings are obtained from the correlation source (e.g., from the supplementary magic box) rather than from the magic box, and thus the outer join operation can be eliminated. If there is a match in correlation binding (that is, if S.C2=Q5.C2 is true), then the corresponding match count will be returned. Otherwise, a null value will be returned (necessary by the definition of a scalar derived table) and will be provided into the COALESCE function, which then produces the proper count of zero. Thus, the outer join operation has been replaced with a correlated scalar derived table. It should be noted that the level of correlation in the query has been reduced to one, and thus from the perspective of the decorrelation process, the original query is completely decorrelated.

Operating Steps of the Query Processor

Figure 10:
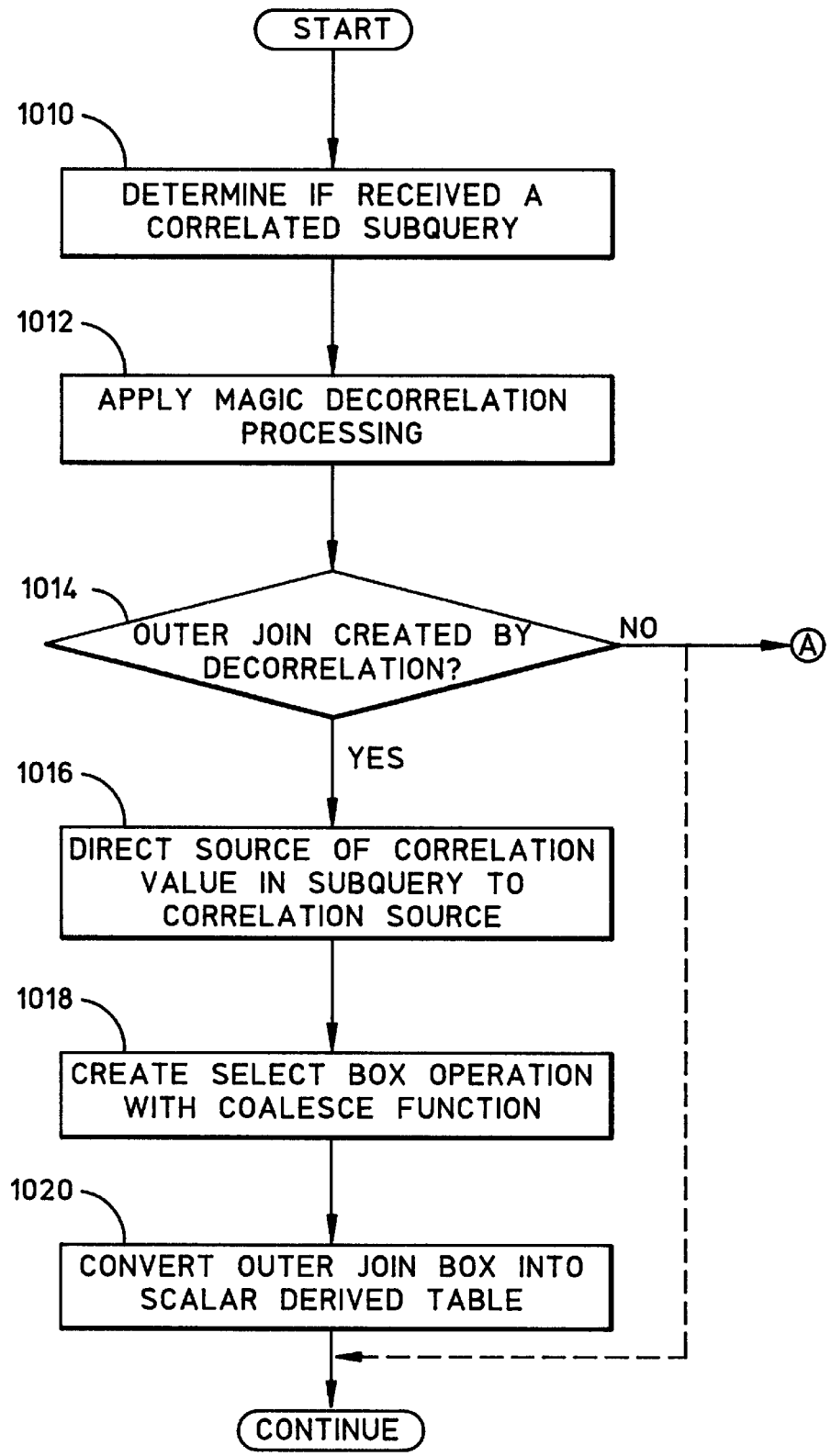
FIG. 10 is a flow diagram that illustrates the processing steps executed by the computer processing system of FIG. 5 to process an SQL query and transform the decorrelated query to eliminate the outer join, in accordance with the invention.

FIG. 10 is a flow diagram that illustrates the processing of the computer system (FIG. 5) in transforming the decorrelated subquery to eliminate the outer join, as illustrated in FIG. 8. The first step of the processing, represented by the flow diagram box numbered 1010, is to determine if a received SQL query has a correlated subquery. The operating steps necessary to make such a determination are part of conventional RDBMS software and should be apparent to those skilled in the art without further explanation. The next step in processing is to perform decorrelation on the SQL statement so as to produce a decorrelated subquery. This processing is represented by the flow diagram box numbered 1012.

In the next processing step, the query processor checks to determine if an outer join operation was created by the decorrelation process, as indicated by the decision box numbered 1014. A negative outcome results in continuation of decorrelation and query evaluation processing. In the preferred embodiment, such processing involves pass-through optimization steps, indicated by the connector A to the flow diagram of FIG. 19, described below. Optionally, a negative outcome results in conventional query optimization processing that does not include the pass-through optimization processing described below. The conventional processing option is indicated by the dashed line from the decision box 1014 to the continuation box 1015.

An affirmative outcome at the decision box 1014 results in replacement of the outer join as illustrated in the above tables. This is the step that will convert the outer join operation into a correlated scalar derived table. In particular, the query processor directs the source of correlation values in the subquery from the magic operation to the correlation source, as indicated by the flow diagram box numbered 1016. This action is taken rather than the conventional action of joining on the correlation column. After directing the correlation value to the correlation source, the query processor next creates a SELECT box with the COALESCE function above the outer join box. This processing step is represented by the FIG. 10 flow diagram box numbered 1018.

Lastly, the query processor removes the reference to the magic operation from the outer join operation, i.e., the magic quantifier ranging over the magic operation is dropped, and then the outer join is converted to a scalar derived table, so null values will be returned when there is no match. This step is indicated by the flow diagram box numbered 1020. Operation continues at the continuation box numbered 1015.

Pass-through Optimization

Another aspect of the system is directed to capitalize on the situation when a derived table (such as produced from the SELECT box, in QGM terminology) does not reference any base tables. In such situations, the system of the preferred embodiment adds a magic quantifier operation to the derived table, forming a join that is a Cartesian product. This is referred to as pass-through optimization of the decorrelated subquery, and can be better understood with reference to the following query having a correlated, derived table (assuming that the derived tables are not merged), listed as Table 6:

TABLE 6

```
SELECT Q1.PK, Q1.C3, Q1.C2, Q1.C1, Q13.C1
FROM T1 Q1,
    TABLE (SELECT C1
    FROM TABLE (SELECT C1
        FROM T2 Q2
        WHERE Q2.C2=Q1.C1) AS Q11(C1)) AS Q13(C1)
WHERE Q1.C3=Q13.C1 AND Q1.C2>0;
```

Figure 11:
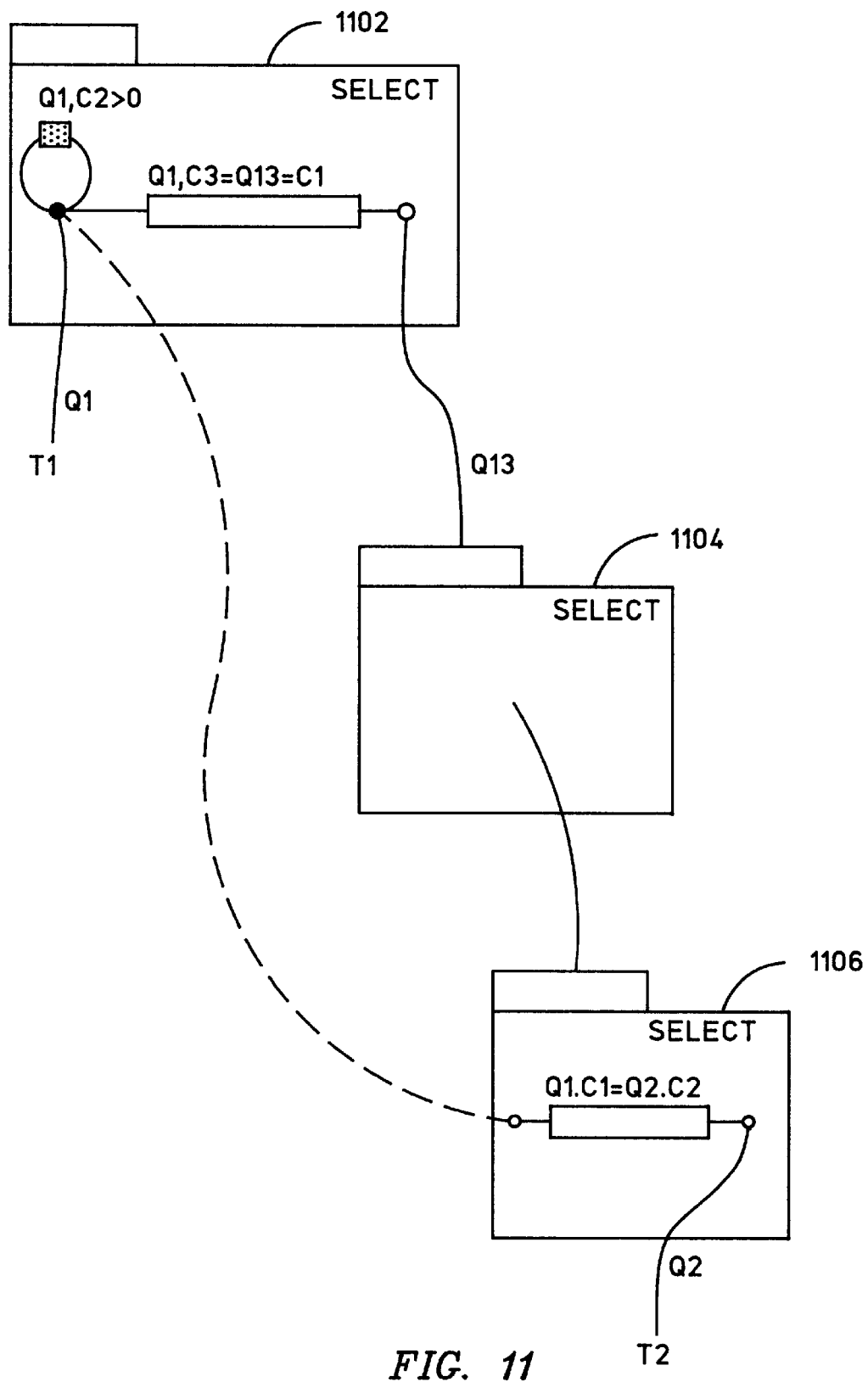
FIG. 11 is a query graph model representation of the SQL correlated subquery depicted in Table 6.

The decorrelated subquery of Table 6 is illustrated graphically (using QBR) in FIG. 11. Thus, FIG. 11 includes three SELECT boxes 1102, 1104, 1106 representing the respective SELECT clauses in Table 6. Those skilled in the art will understand that conventional rewrite operations on the correlated subquery of Table 6 using magic decorrelation in the prior art would produce the decorrelated subquery listed below in Table 7:

TABLE 7

```
WITH SUPPMAGIC_T1 (C1, C2, C3, PK) AS
    (SELECT C1, C2, C3, PK
    FROM T1
    WHERE C2 > 0),
MAGIC_1 (C1) AS
    (SELECT DISTINCT C1
```

TABLE 7-continued

```
    FROM SUPPMAGIC_T1),
MAGIC_2 (C1) AS
    (SELECT DISTINCT C1
    FROM MAGIC_1),
T10 (C1, corr_column) AS
    (SELECT Q11.C1, Q9.C1
    FROM MAGIC_2 Q9, T2 Q11
    WHERE Q11.C2=Q9.C1),
DCO_2 (C1, corr_column) AS
    (SELECT C1, corr_column
    FROM T10)
SELECT Q3.C1, Q3.C2, Q3.C3, Q3.PK, CI_1.CI
FROM SUPPMAGIC_T1 Q3,
    TABLE (SELECT DCO_1.C1
        FROM TABLE (SELECT Q6.C1, corr_column
            FROM TABLE (SELECT CI_1.C1, M.C1
                FROM MAGIC_1 M,
                    TABLE (SELECT Q14.C1
                    FROM DCO_2 Q14
                    WHERE
                        Q14.corr_column=M.C1
                    ) AS CI_1(C1)
                ) AS Q6 (C1 corr_column)
            ) AS DCO_1 (C1, corr_column)
        WHERE Q3.C1=DCO_1.corr_column
        ) AS CI_1 (C1)
WHERE Q3.C3=CI_1.C1;
```

Figure 12:
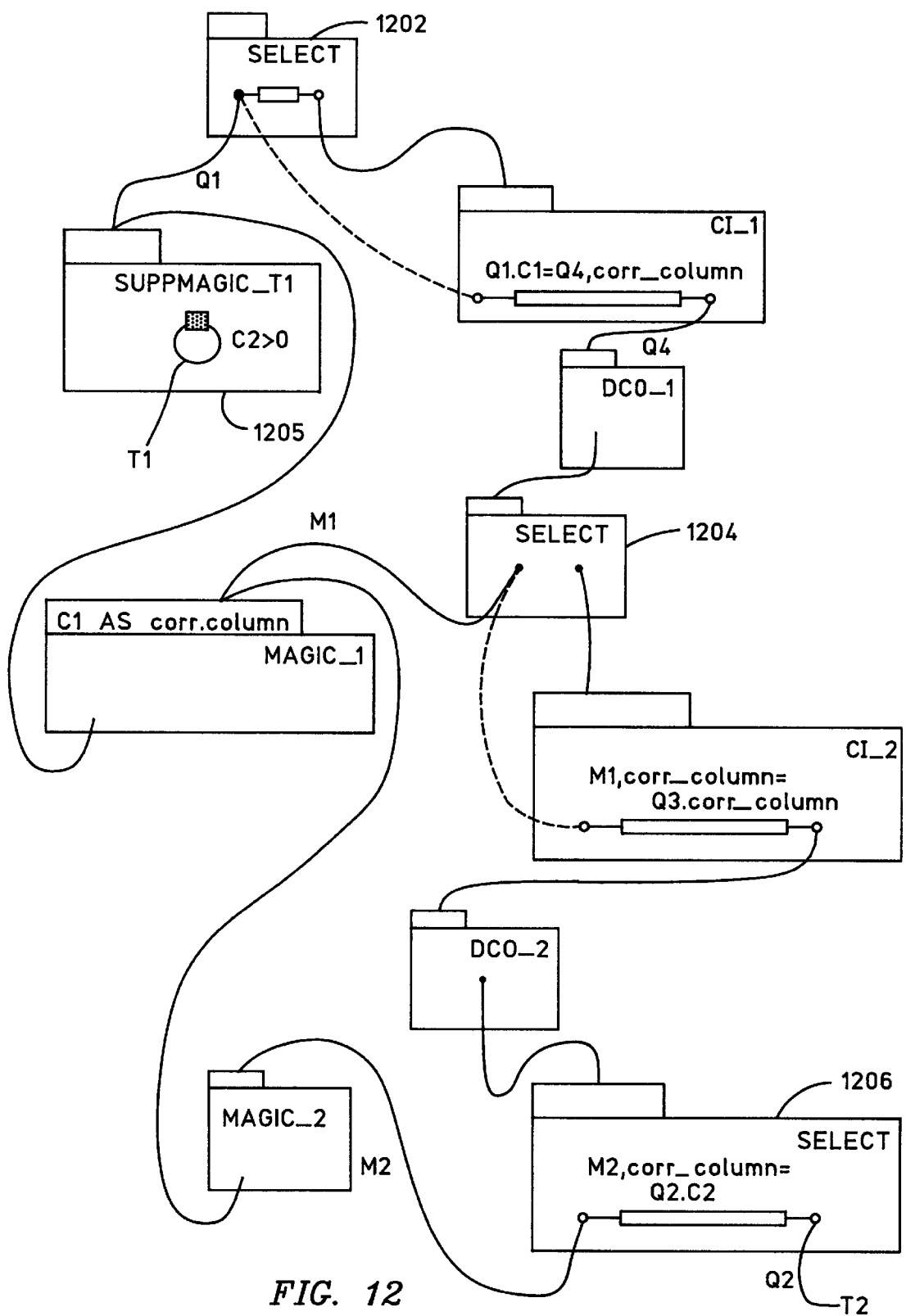
FIG. 12 is a query graph model representation of the decorrelated subquery depicted in Table 7 after transformation.

The decorrelated query of Table 7 is illustrated graphically (using QBR) in FIG. 12. The graphical representation of FIG. 12 and the listing of Table 7 are the result of conventional decorrelation processing carried out by the query processor constructed in accordance with the present invention. In FIG. 12, boxes 1204 and 1206 correspond to boxes 1104 and 1106 in FIG. 11, respectively. The supplementary box (SUPPMAGIC_T1) is referenced as the box numbered 1204. The magic boxes are MAGIC_1 and MAGIC_2. The CI and DCO boxes for the SELECT box 1204 are CI_1 and DCO_1, respectively. Similarly, the CI and DCO boxes for the SELECT box 1206 are CI_2 and DCO_2, respectively. After application of the pass-through optimization processing, the query is transformed into the format given by Table 8, below:

TABLE 8

```
WITH SUPPMAGIC_TI (C1, C2, C3, PK) AS
    (SELECT C1, C2, C3, PK
    FROM T1
    WHERE C2 > 0),
MAGIC_1 (C1) AS
    (SELECT DISTINCT c1
    FROM SUPPMAGIC_T1),
MAGIC_2 (C1) AS
    (SELECT DISTINCT C1
    FROM MAGIC_1),
T10 (C1, corr_column) AS
    (SELECT Q11.C1, Q9.C1
    FROM MAGIC_2 Q9, T2 Q11
    WHERE Q11.C2=Q9.C1),
DCO_2 (C1, corr_column) AS
    (SELECT C1, corr_column
    FROM T10)
SELECT Q3.C1, Q3.C2, Q3.C3, Q3.PK, CI_1.C1
FROM SUPPMAGIC_T1 Q3,
    TABLE (SELECT DCO_1.C1
        FROM TABLE (SELECT Q6.C1, corr_column
            FROM TABLE (SELECT CI_1.C1, M.C1
                FROM TABLE (SELECT Q14.C1
                    FROM DCO_2 Q14
                    WHERE
                        Q14.corr_column=Q3.C1
                    ) AS CI_1(C1)
                ) AS Q6 (C1, corr_column)
```

TABLE 8-continued

```
            ) AS DCO_1 (C1)
          ) AS CL_1 (C1)
WHERE Q3.C3=CL_1.C1;
```

Figure 13:
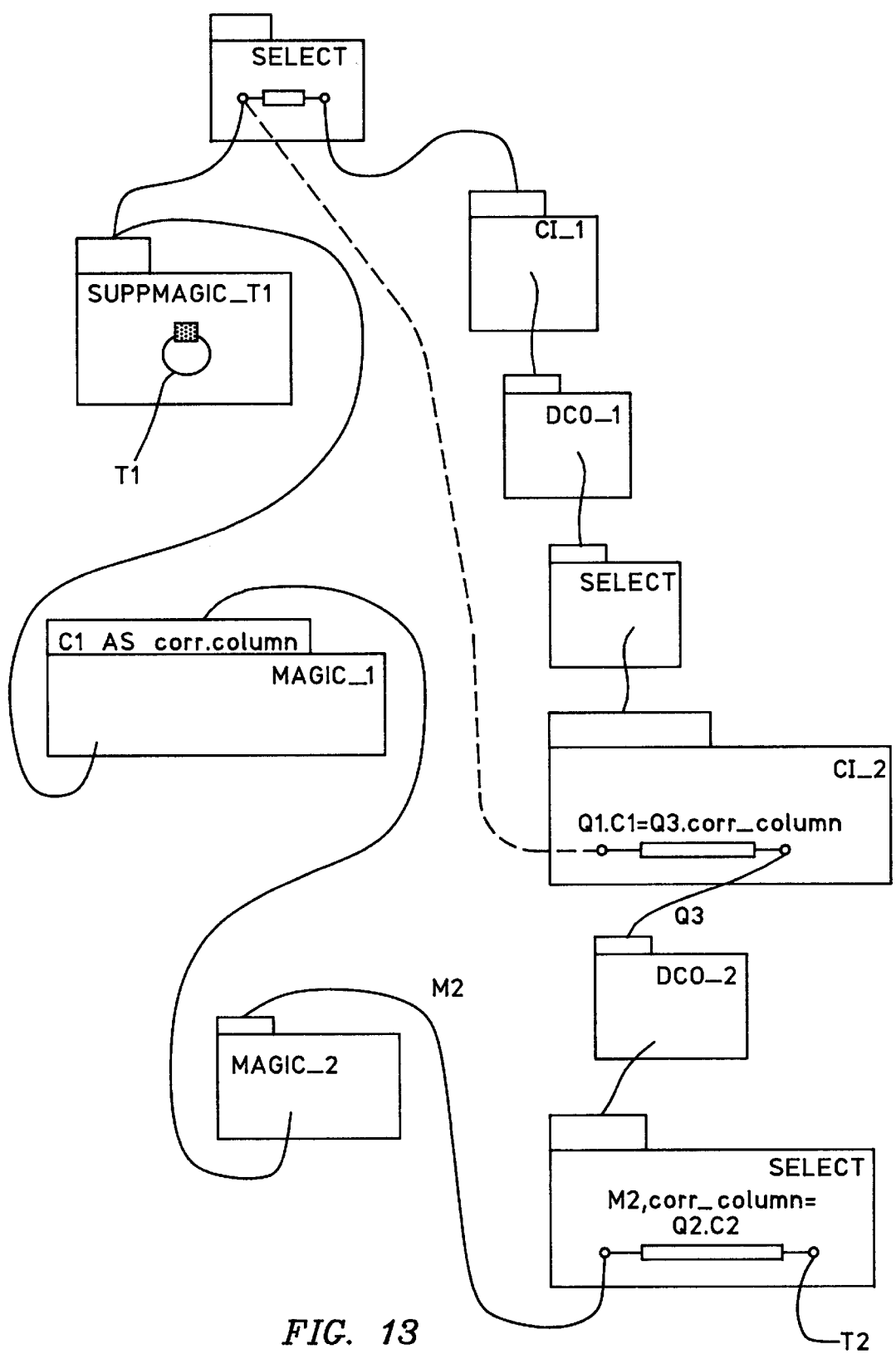
FIG. 13 is a query graph model representation of the transformed SQL decorrelated subquery depicted in Table 8 after pass-through optimization.

The processed, decorrelated query of Table 8 is illustrated graphically (using QBR) in FIG. 13. The pass-through processing eliminates a join and its magic quantifier. This will improve the execution time significantly. In an MPP shared-nothing environment, the execution of the derived table T10 (following the MAGIC_2 selection clause) is performed in a set-oriented fashion. The correlation portion of the query (that is, from the main query to CI_2) can be executed locally, meaning that the tuples from the table T10 can be shipped to sites where the SUPPMAGIC_T1 table resides.

Comparison of Table 7 with Table 8 shows the effects of pass-through optimization in accordance with the present invention. The "FROM MAGIC_1 m, . . . WHERE Q14.corr_column=M.C1" clause of Table 7 is replaced with a "FROM TABLE(SELECT Q14.C1 . . . WHERE Q14.corr_column=Q3.C1" clause of Table 8. These changes result in the processor receiving the result of the nested subqueries from the correlation source (Table 8) rather than from the magic operation box (Table 7).

Next consider another SQL query, this one having a SELECT . . . GROUP BY . . . HAVING operation, listed in Table 9:

TABLE 9

| SELECT | Q1.C1, Q1.C2, Q1.C3 |
|---|---|
| FROM | T1,Q1 |
| WHERE | Q1.C3 > 0 AND |
| | Q1.C1 = ALL  (SELECT MAX(PK) |
| | FROM T2 Q2 |
| | WHERE Q2.C1=Q1.C2 |
| | GROUP BY C3 |
| | HAVING COUNT (C2)=1); |

Figure 14:
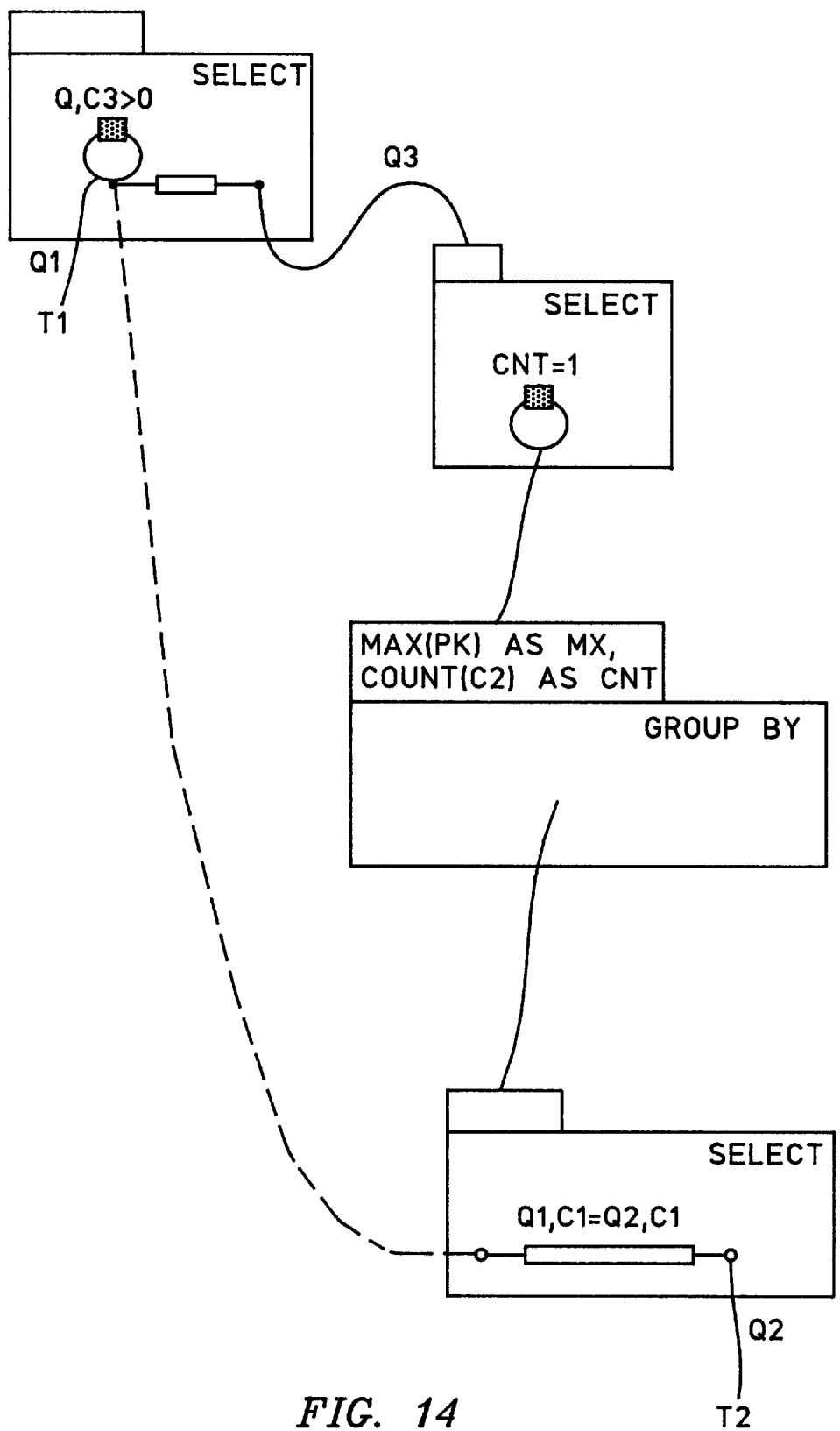
FIG. 14 is a query graph model representation of the SQL correlated subquery depicted in Table 9.
Figure 15:
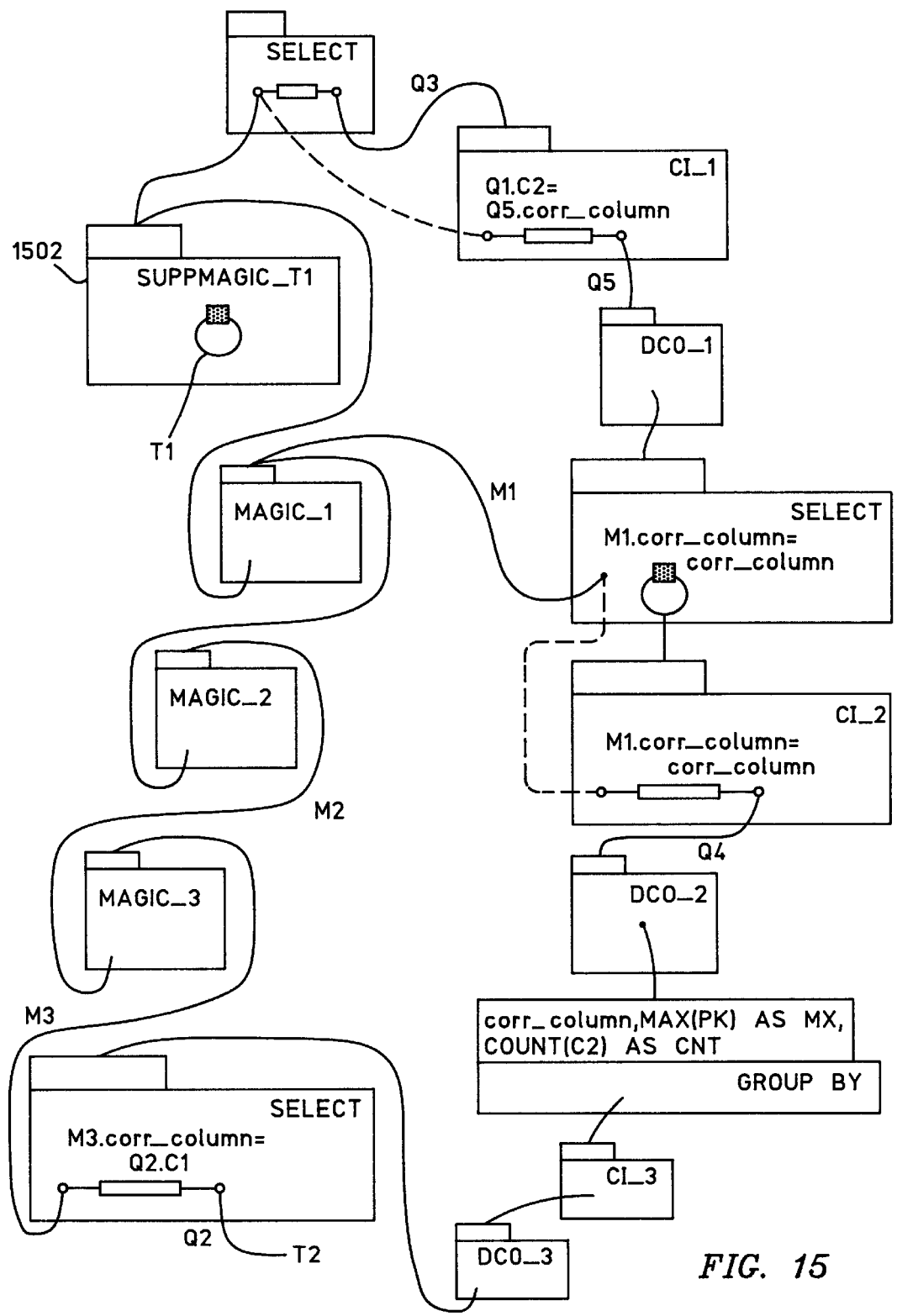
FIG. 15 is a query graph model representation of the decorrelated subquery depicted in Table 10 after transformation.

The SELECT . . . HAVING query of Table 9 is illustrated graphically (using QBR) in FIG. 14. This is the initial state of the correlated query that is to be optimized in accordance with the invention. After conventional decorrelation processing, the Table 9 query would be converted to the form illustrated in FIG. 15 before additional query rewrite optimizations are applied. After magic decorrelation processing and view merge took place, the decorrelated subquery would be depicted as follows in Table 10:

TABLE 10

```
WITH SUPPMAGIC_T1 (C1, C2, C3, PK) AS
    (SELECT C1, C2, C3, PK
     FROM T1
     WHERE C2 > 0),
MAGIC_1 (corr_column) AS
    (SELECT DISTINCT C1
     FROM SUPPMAGIC_T1),
MAGIC_2 (corr_column) AS
    (SELECT DISTINCT corr_column
     FROM MAGIC_1),
SELECT Q1.C1, Q1.C2, Q1.C3
FROM SUPPMAGIC_T1 Q1,
WHERE Q1.C1=ALL   (SELECT MX
        FROM    MAGIC_1 M1,
                TABLE
                (SELECT corr_column,max(PK),COUNT(C2)
                 FROM T2 Q2, MAGIC_2 M2
```

TABLE 10-continued

```
                 WHERE M2.corr_column=Q2.C1
                 GROUP BY corr_column) AS
                 Q5(corr_column, MX, CNT)
        WHERE   M1 .corr_column=Q5.corr_column AND
                Q5.CNT=1 AND Q1.C2=M1.corr_column);
```

Figure 16:
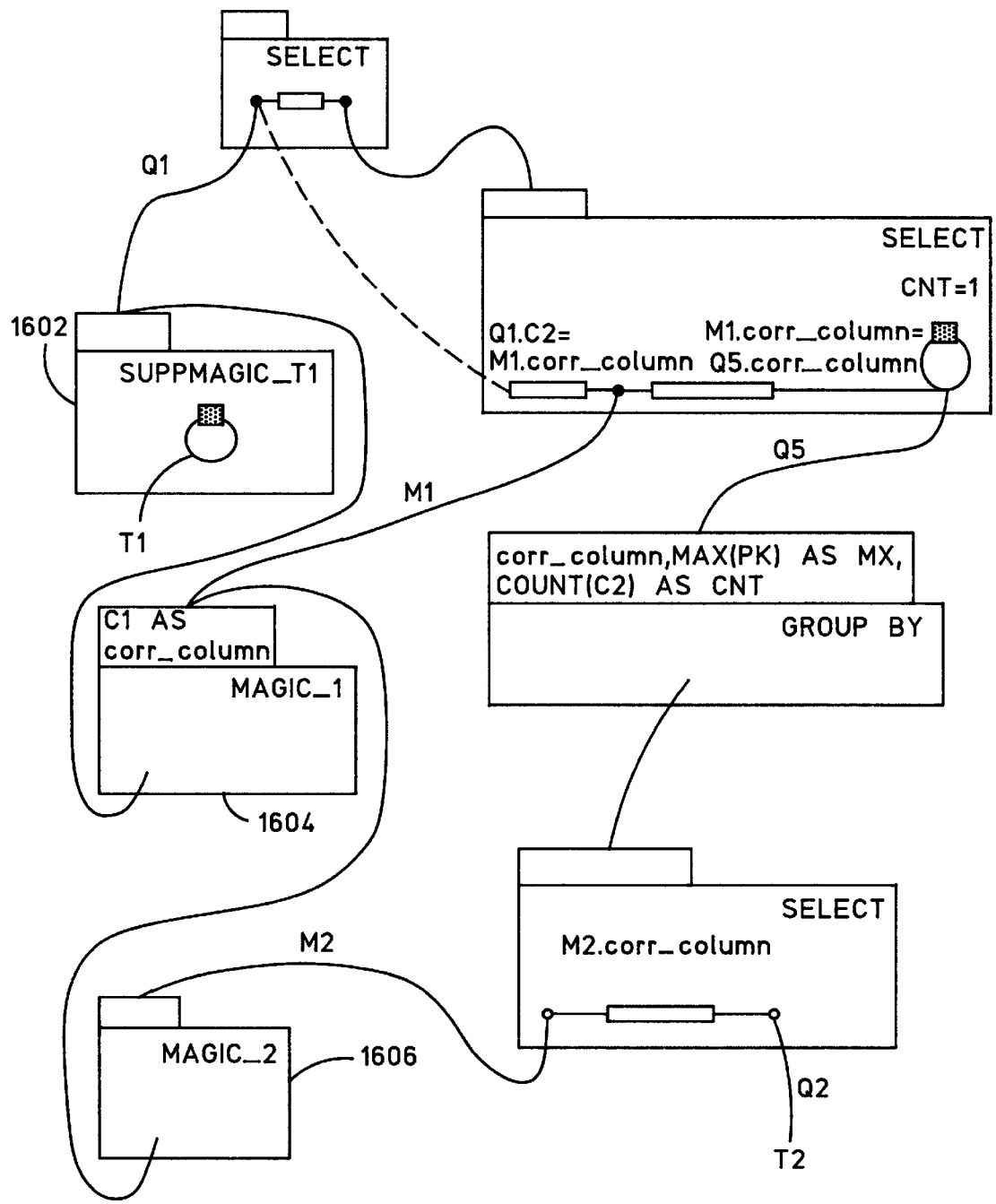
FIG. 16 is a query graph model representation of an alternative decorrelation of the subquery depicted in Table 10 after query rewrite optimizations.

The decorrelated query of Table 10 is illustrated graphically (using QBR) in FIG. 16. This shows the supplementary magic box 1602 and the two boxes for the first MAGIC_1 operation 1604 and the second MAGIC_2 operation 1606. FIG. 16 shows another representation of the decorrelated subquery, after other rewrite optimizations have been applied, such as view merge. After the pass-through optimization processing is applied, the decorrelated subquery is transformed into the condition in Table 11, listed below.

TABLE 11

```
WITH SUPPMAGIC_T1 (C1, C2, C3, PK) AS
    (SELECT C1, C2, C3, PK
     FROM T1
     WHERE C2 > 0),
MAGIC_2 (corr_column) AS
    (SELECT DISTINCT corr_column
     FROM SUPPMAGIC_T1),
SELECT Q1.C1, Q1.C2, Q1.C3
FROM SUPPMAGIC_T1 Q1,
WHERE Q1.C1=ALL   (SELECT MX
        FROM TABLE (SELECT corr_column, max(PK), COUNT(C2)
                 FROM T2 Q2, MAGIC_2 M2
                 WHERE M2.corr_column=Q2.C1
                 GROUP BY corr_column) AS
                 Q5(corr_column, MX, CNT)
        WHERE    Q5.CNT=1 AND Q1.C2=M1.corr_column);
```

Figure 17:
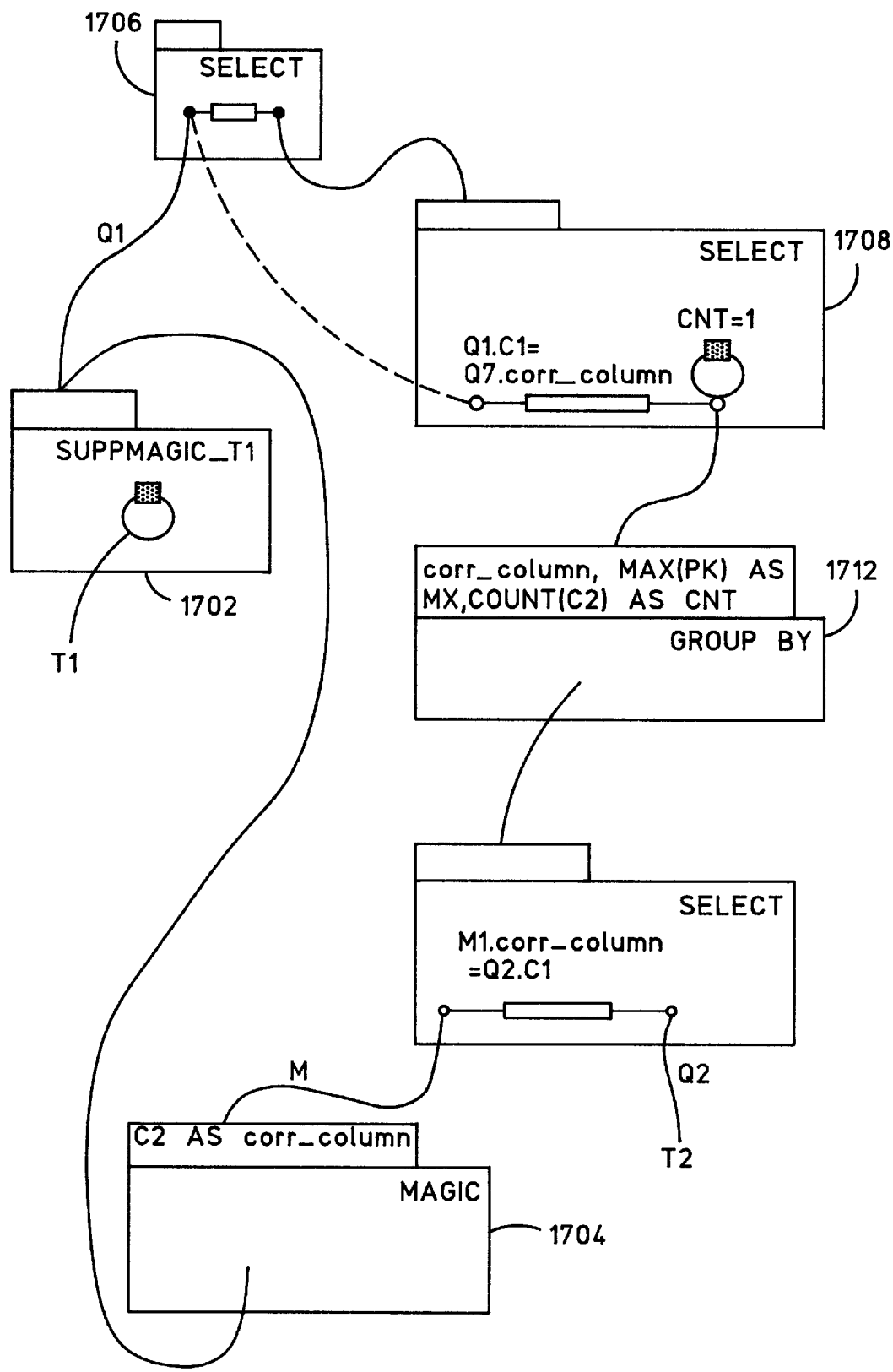
FIG. 17 is a query graph model representation of the transformed SQL decorrelated subquery depicted in Table 11 after pass-through optimization.

The transformed, decorrelated query of Table 11 is illustrated graphically (using QBR) in FIG. 17. As with the first example, the pass-through processing eliminates a join and its magic quantifier, and significantly improves the execution time for query evaluation, especially in an MPP shared-nothing environment. The supplementary magic table is represented by the SUPPMAGIC_T1 box 1702, which supplies a result to the magic decorrelation box 1704.

The magic box 1704 provides all correlation bindings to the subquery as indicated by the box numbered 1710. The result of the join in the subquery is provided to the GROUP BY operation numbered 1712. Essentially, the GROUP BY operation produces a row for each unique correlation value. The box 1708 is a correlated derived table as far as the main query box numbered 1706 is concerned. In other words, for each correlation value, the SELECT box numbered 1708 may return zero or more rows, producing the same result as in the query before the decorrelation process.

Figure 18:
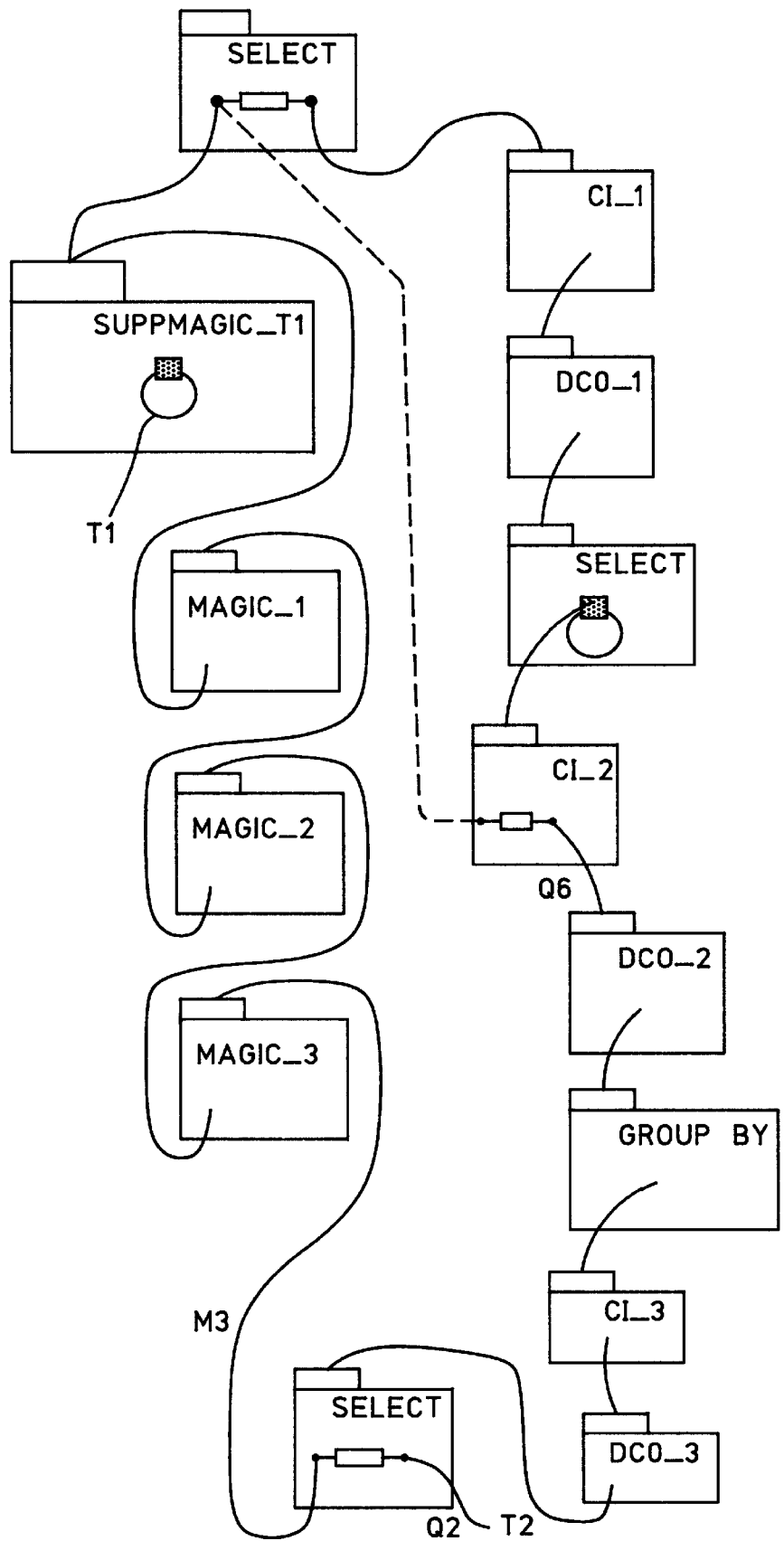
FIG. 18 is a query graph model representation of an alternative decorrelation of the subquery depicted in Table 11.

The increased efficiency of the pass-through optimization processing is illustrated by the query graph model of FIG. 18, which shows the decorrelated query before other rewrite optimization techniques are applied.

Pass-Through Optimization Processing Steps

Figure 19:
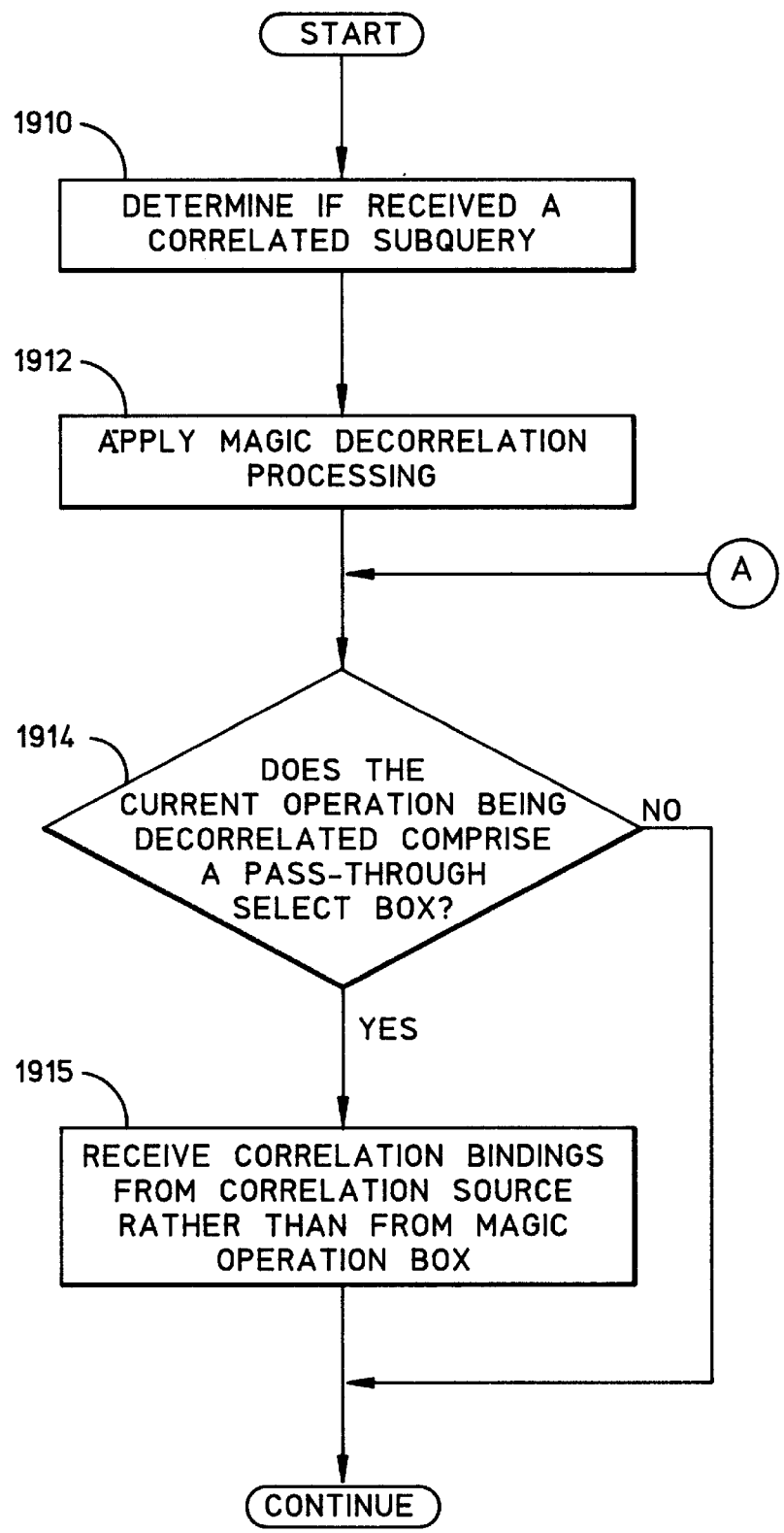
FIG. 19 is a flow diagram that illustrates the processing steps executed by the computer processing system of FIG. 5 to perform the pass-through optimization step.

FIG. 19 is a flow diagram that shows the processing steps executed by the processor of the RDBMS in performing pass-through optimization. As with the decorrelation processing described above in conjunction with FIG. 10, the first step is to determine if a correlated subquery is being processed. Thus, the first step of the FIG. 19 processing, represented by the flow diagram box numbered 1910, is to determine if a received SQL query has a correlated subquery. The operating steps necessary to make such a determination are part of conventional RDBMS software and should be apparent to those skilled in the art without further explanation. The next step in processing is to perform decorrelation on the SQL statement so as to produce a decorrelated subquery. This processing is represented by the flow diagram box numbered 1912.

The pass-through optimization can be used with or without the decorrelation processing described above for eliminating outer joins. The connector A in FIG. 19 relates to the result of the earlier FIG. 10 test for an outer join following decorrelation. Recall from FIG. 10 processing that if no outer join was created from decorrelation, the system could optionally perform pass-through processing. The connector A indicates the relation to processing in which a negative outcome at the test for outer joins (box 1014 of FIG. 10) results in performing the pass-through optimization steps.

After the decorrelation processing, with or without first checking for outer joins, the pass-through processing determines if the current operation being decorrelated is a pass-through SELECT box. If it is not, a negative outcome, then decorrelation processing continues in a conventional manner. If the operation is a pass-through SELECT box, an affirmative outcome at the decision box 1914, then the processor converts the SELECT box such that the SELECT box receives correlation bindings from the correlation source rather than from the magic operation box, as would be conventional. Decorrelation processing then continues.

Advantages of the Invention

The RDBMS described above efficiently evaluates correlated queries by decorrelating them to take care of the so-called SQL count bug and yet avoid using the expensive outer join operation. When there is no tuple match from a correlated subquery, the query processor returns a tuple of null value(s) from a scalar derived table and then uses a COALESCE operation to generate a zero value from the null return, which then can be optimized without accessing a base table. The query processor also performs a pass-through optimization operation to eliminate a join operation for floating select operations. The query processor recognizes that, for floating select operations, a join operation can be removed from the floating select operation and the correlation bindings can be received from the correlation source table rather than a magic box operation. Elimination of the join operation increases the efficiency of the query evaluation operations.

The present invention has been described above in terms of presently preferred embodiments so that an understanding of the present invention can be conveyed. There are, however, many configurations for SQL-processing relational data base management systems not specifically described herein but with which the present invention is applicable. The present invention should therefore not be seen as limited to the particular embodiments described herein, but rather, it should be understood that the present invention has wide applicability with respect to SQL-processing relational data base management systems generally. All modifications, variations, or equivalent arrangements and implementations that are within the scope of the attached claims should therefore be considered within the scope of the invention.

We claim:

1. A method of processing a query in a relational database management system that optimizes the query to retrieve data from computer storage, the method comprising the steps of:

receiving a correlated subquery;

performing a decorrelation operation on the correlated subquery;

determining if an outer join operation was created by the decorrelation operation; and responding to a created outer join operation by converting the created outer join operation of the decorrelated subquery into a correlated scalar derived table with a COALESCE function, wherein the input to the function is the result from the decorrelated subquery, and correlation bindings of the scalar derived table are obtained from the correlation source directly and not from a magic operation.

2. A method as defined in claim 1, wherein the step of converting comprises the steps of:

obtaining the correlation bindings in the outer join operation from the correlation source rather than from the magic operation;

eliminating the access of the magic operation by eliminating the quantifier that ranges over the magic operation;

creating a SELECT operation with the COALESCE function above the outer join operation to return a zero count value when there is no match for a given correlation binding; and bypassing and eliminating the outer join operation.

3. A method as defined in claim 1, wherein the step of determining comprises executing a conversion process to convert an outer join operation created by the decorrelation into a correlated scalar derived table, if an outer join operation was not created, further comprising the step of executing a query pass-through optimization process to eliminate a join operation for a floating SELECT operation of the decorrelated subquery.

4. A method as defined in claim 1, wherein the step of determining comprises executing a conversion process to convert an outer join operation created by the decorrelation operation into a correlated scalar derived table, and executing a query pass-through optimization process to thereby eliminate a join operation of a floating SELECT operation of the correlated subquery.

5. A method as defined in claim 4, wherein the step of executing a query pass-through optimization comprises determining if a current operation being decorrelated is a pass-through SELECT operation that does not reference any base table and, if it is, receiving the correlation bindings from the correlation source rather than from a magic operation, and eliminating the access to the magic operation.

6. A method of processing a query in a relational database management system that optimizes the query to retrieve data from computer storage, the method comprising the steps of:

receiving a correlated subquery;

performing a decorrelation operation on the correlated subquery;

determining if a current subquery operation being decorrelated is a pass-through SELECT operation; and executing a query pass-through optimization process to eliminate a join operation for a floating SELECT operation that does not reference any base table.

7. A method as defined in claim 6, wherein the step of executing comprises receiving correlation bindings from the correlation source rather than from the magic operation, and eliminating the access to the magic operation by eliminating the quantifier that ranges over the magic operation.

8. A relational database management system comprising:

a central processing unit at a first node of a computer network; and a query processor that receives relational queries at the first node and optimizes them to retrieve data from the data storage devices, wherein the query processor evaluates queries by performing the steps of:
  receiving a correlated subquery;
  performing a decorrelation operation on the correlated subquery;
  determining if outer join operation was created by the decorrelation operation; and
  responding to a created outer join operation by converting the created outer join operation of the decorrelated subquery into a correlated scalar derived table using a COALESCE function, wherein the input to the function is the result from the decorrelated subquery, and correlation bindings of the scalar derived table are obtained from the correlation source directly and not from a magic operation.

9. A system as defined in claim 8, wherein the query processor converts the created outer join operation by performing the steps of:
  obtaining the correlation bindings in the outer join operation from the correlation source rather than from a magic operation;
  eliminating the access of the magic operation by eliminating the quantifier that ranges over the magic operation;
  creating a SELECT operation with the COALESCE function above the outer join operation to return a zero count value when there is no match for a given correlation binding; and
  bypassing and eliminating the outer join operation.

10. A system as defined in claim 8, wherein the query processor performs the step of determining by executing a query pass-through optimization process to eliminate a join operation for a floating SELECT operation of the decorrelated subquery.

11. A system as defined in claim 8, wherein the query processor responds to a created outer join by executing a conversion process to convert the outer join operation created by the decorrelation operation into a correlated scalar derived table, and executes a query pass-through optimization process to thereby eliminate a join operation of a floating SELECT operation of the correlated subquery.

12. A system as defined in claim 11, wherein the query processor executes the query pass-through optimization process by determining if a current operation being decorrelated is a pass-through SELECT operation that does not reference any base table and, if it is, by receiving the correlation bindings from the correlation source rather than from a magic operation, and by eliminating the access to the magic operation.

13. A relational database management system comprising:
  a central processing unit at a first node of a computer network; and
  a query processor that receives relational queries at the first node and optimizes them to retrieve data from the data storage devices, wherein the query processor optimizes by performing the steps of:
    receiving a correlated subquery;
    performing a decorrelation operation on the correlated subquery; and
    determining if a current subquery operation being decorrelated is a pass-through SELECT operation; and
    executing a query pass-through optimization process to eliminate a join operation for a floating SELECT operation that does not reference any base table.

14. A system as defined in claim 13, wherein the query processor executes the query pass-through optimization process by receiving correlation bindings from the correlation source rather than from a magic operation, and eliminating the access to the magic operation by eliminating the quantifier that ranges over the magic operation.

15. A program product data storage device, tangibly embodying a program of machine-readable instructions executable by a computer system connected to a computer network, the program product comprising:
  a recordable media;
  a relational data base management system (RDBMS) recorded on the recordable media, the RDBMS having a query processor that evaluates queries by performing the steps of
    receiving a correlated subquery;
    performing a decorrelation operation on the correlated subquery;
    determining if an outer join operation was created by the decorrelation operation; and
    responding to a created outer join operation by converting the created outer join operation of the decorrelated subquery into a correlated scalar derived table using a COALESCE function, wherein the input to the function is the result from the decorrelated subquery, and correlation bindings of the scalar derived table are obtained from the correlation source directly and not from a magic operation.

16. A program product as defined in claim 15, wherein the query processor converts by performing the steps of:
  directing the correlation subquery value to the source table; and
  generating a SELECT operation with a COALESCE function to convert a null value of the correlation subquery into a zero value count value.

17. A program product as defined in claim 15, where the query processor performs the step of determining by executing a conversion process to eliminate a join operation for a floating SELECT operation of the decorrelated subquery.

18. A program product as defined in claim 15, wherein the query processor performs the step of determining by executing a conversion process to convert an outer join operation created by the decorrelation operation into a correlated scalar derived table, and executing a query pass-through optimization process to eliminate a join operation of a floating SELECT operation of the correlated subquery.

19. A program product as defined in claim 18, wherein the query processor performs the step of executing a query pass-through optimization by determining if a current operation being decorrelated is a pass-through SELECT operation that does not reference any base table and, if it is, receiving the correlation bindings from the correlation source rather than from a magic operation, and eliminating the access to the magic operation.

20. A program product data storage device, tangibly embodying a program of machine-readable instructions executable by a computer system connected to a computer network, the program product comprising:
  a recordable media;
  a relational data base management system (RDBMS) recorded on the recordable media, the RDBMS having a query processor that processes the query by performing the steps of
    receiving a correlated subquery;
    performing a decorrelation operation on the correlated subquery; and determining if a current subquery operation being decorrelated is a pass-through SELECT operation; and executing a query pass-through optimization process to eliminate a join operation of a floating SELECT operation that does not reference any base table.

21. A program product as defined in claim 20, wherein the query processor performs the step of executing a query pass-through optimization process by receiving correlation bindings from the correlation source rather than from a magic operation, and eliminating the access to the magic operation by eliminating the quantifier that ranges over the magic operation.

* * * * *